US011623314B2

(12) United States Patent
Sato

(10) Patent No.: US 11,623,314 B2
(45) Date of Patent: Apr. 11, 2023

(54) MAGNETIC CHUCK

(71) Applicant: SMC Corporation, Tokyo (JP)

(72) Inventor: Motohiro Sato, Toride (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 17/406,468

(22) Filed: Aug. 19, 2021

(65) Prior Publication Data

US 2022/0063036 A1 Mar. 3, 2022

(30) Foreign Application Priority Data

Aug. 31, 2020 (JP) .............................. JP2020-145725
Jun. 3, 2021 (JP) .............................. JP2021-093808

(51) Int. Cl.
*B23Q 3/154* (2006.01)
*H01F 7/02* (2006.01)
*B25J 15/06* (2006.01)

(52) U.S. Cl.
CPC ........ *B23Q 3/1546* (2013.01); *B25J 15/0608* (2013.01); *H01F 7/0252* (2013.01)

(58) Field of Classification Search
CPC .. B23Q 3/1546; H01F 7/0252; B25J 15/0608; B25J 15/0683; F16B 47/00; F16B 1/00; F16B 2001/0035; B65G 47/92
See application file for complete search history.

(56) References Cited

U.S. PATENT DOCUMENTS

| | | | | |
|---|---|---|---|---|
| 4,121,865 A * | 10/1978 | Littwin, Sr. | ........... | B66C 1/0231 414/797 |
| 6,015,175 A * | 1/2000 | Carruth | .................... | B66C 1/04 294/192 |
| 6,086,125 A * | 7/2000 | Kovacs | .................... | B66C 1/04 294/192 |
| 2005/0134063 A1* | 6/2005 | Jacobs | .................. | B65G 47/92 294/2 |
| 2016/0184981 A1* | 6/2016 | Kanda | .................. | B23Q 3/1546 269/8 |
| 2016/0189844 A1* | 6/2016 | Yajima | .................. | H01F 7/0257 335/285 |
| 2021/0023665 A1 | 1/2021 | Yajima et al. | | |
| 2021/0101236 A1 | 4/2021 | Yajima et al. | | |

FOREIGN PATENT DOCUMENTS

| | | |
|---|---|---|
| JP | 51-102174 U | 8/1976 |
| JP | 2019-186324 A | 10/2019 |
| JP | 2019-186325 A | 10/2019 |

* cited by examiner

*Primary Examiner* — Mohamad A Musleh
(74) *Attorney, Agent, or Firm* — Oblon, McClelland, Maier & Neustadt, L.L.P.

(57) ABSTRACT

A magnetic chuck includes a cylinder tube including a workpiece attraction surface to which a workpiece is attracted, a piston assembly including a permanent magnet and being movable in an internal space of the cylinder tube, the piston assembly separating the internal space of the cylinder tube into a first pressure chamber and a second pressure chamber, a first supply/discharge port formed in the cylinder tube and communicating with the first pressure chamber, a second supply/discharge port formed in the cylinder tube and communicating with the second pressure chamber, and a communication passage configured to allow the first pressure chamber and the second pressure chamber to communicate with each other.

6 Claims, 13 Drawing Sheets

MAGNETIC CHUCK

CROSS-REFERENCE TO RELATED APPLICATIONS

This application is based upon and claims the benefit of priority from Japanese Patent Applications No. 2020-145725 filed on Aug. 31, 2020 and No. 2021-093808 filed on Jun. 3, 2021, the contents all of which are incorporated herein by reference.

BACKGROUND OF THE INVENTION

Field of the Invention

The present invention relates to a magnetic chuck.

Description of the Related Art

There is known a magnetic chuck in which a permanent magnet is connected to a piston inside a cylinder and the permanent magnet is displaced together with the piston (see JP S51-102174 U). In such a magnetic chuck, the permanent magnet approaches the workpiece following the displacement of the piston receiving the fluid pressure. As the permanent magnet approaches the workpiece, the workpiece is attracted and held. The workpiece is released when the piston is displaced in the direction away from the workpiece.

SUMMARY OF THE INVENTION

When a high-temperature workpiece is attracted and held, a member provided in the magnetic chuck may be damaged. Even in the case of attracting and holding a high-temperature workpiece, it is preferable to suppress damage to members provided in the magnetic chuck.

An object of the present invention is to provide a magnetic chuck having good heat resistance.

A magnetic chuck includes a cylinder tube including a workpiece attraction surface to which a workpiece is attracted, a piston assembly including a permanent magnet and being movable in an internal space of the cylinder tube, the piston assembly separating the internal space of the cylinder tube into a first pressure chamber and a second pressure chamber, a first supply/discharge port formed in the cylinder tube and communicating with the first pressure chamber, a second supply/discharge port formed in the cylinder tube and communicating with the second pressure chamber, and a communication passage configured to allow the first pressure chamber and the second pressure chamber to communicate with each other.

According to the present invention, it is possible to provide a magnetic chuck having good heat resistance.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a magnetic chuck according to the present invention will be described in detail below with reference to the accompanying drawings.

First Embodiment

Figure 1:
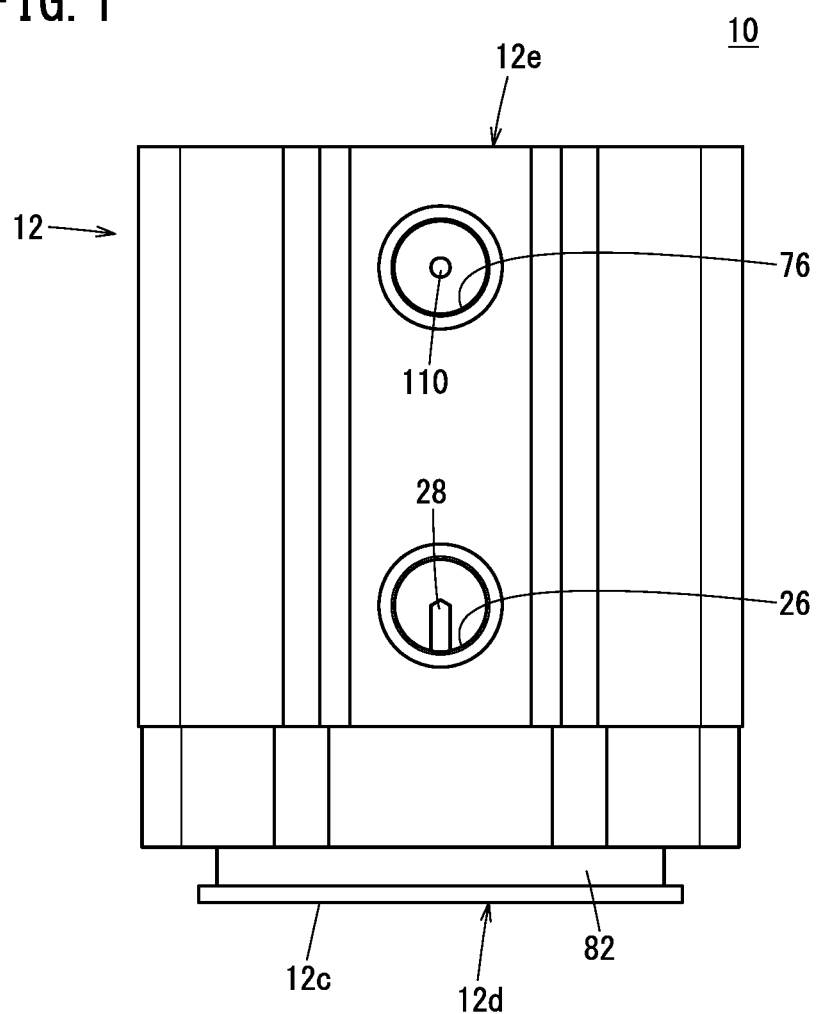
FIG. 1 is a front view showing a magnetic chuck according to a first embodiment.
Figure 2:
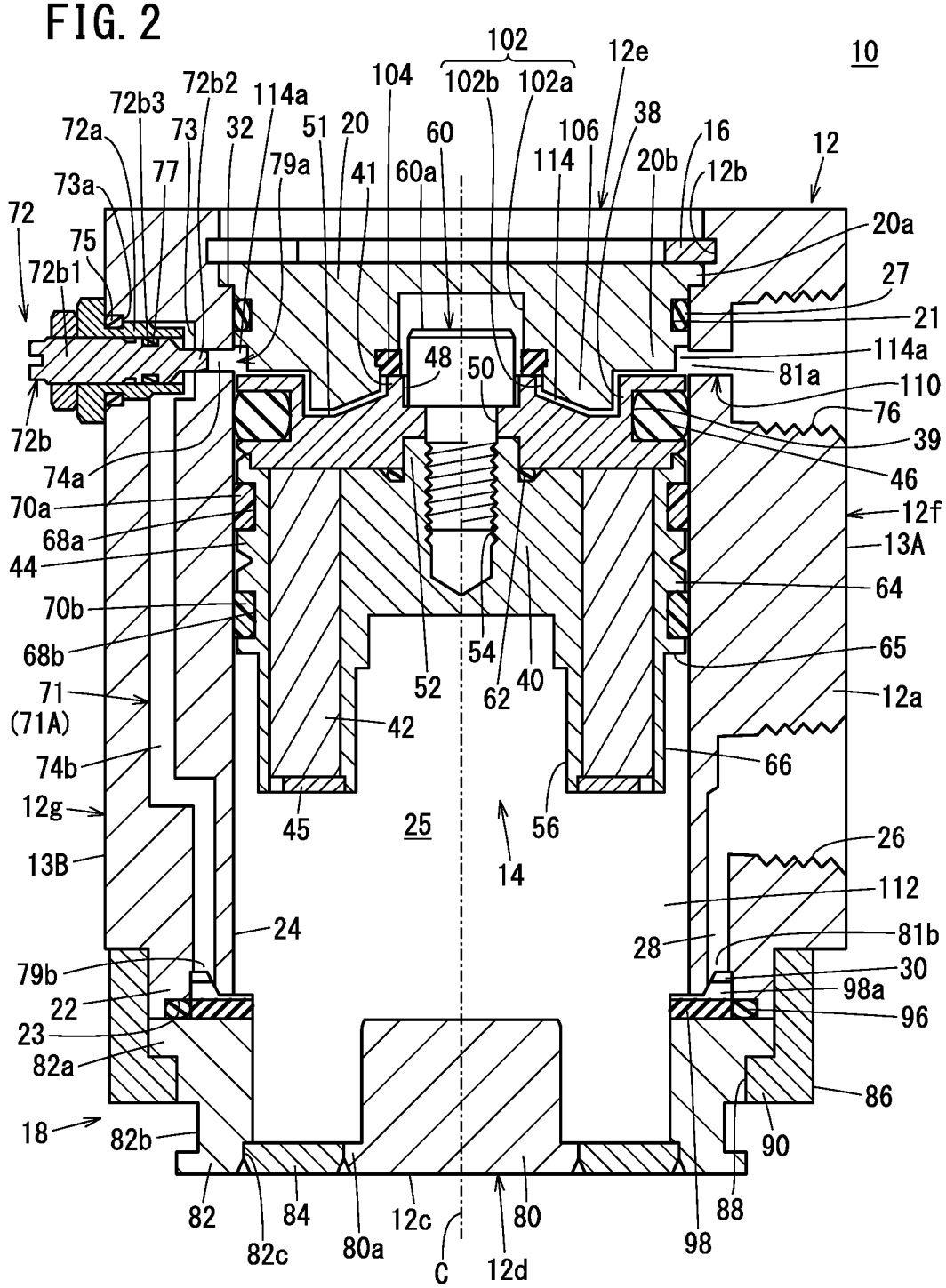
FIG. 2 is a cross-sectional view showing the magnetic chuck according to the first embodiment.
Figure 3:
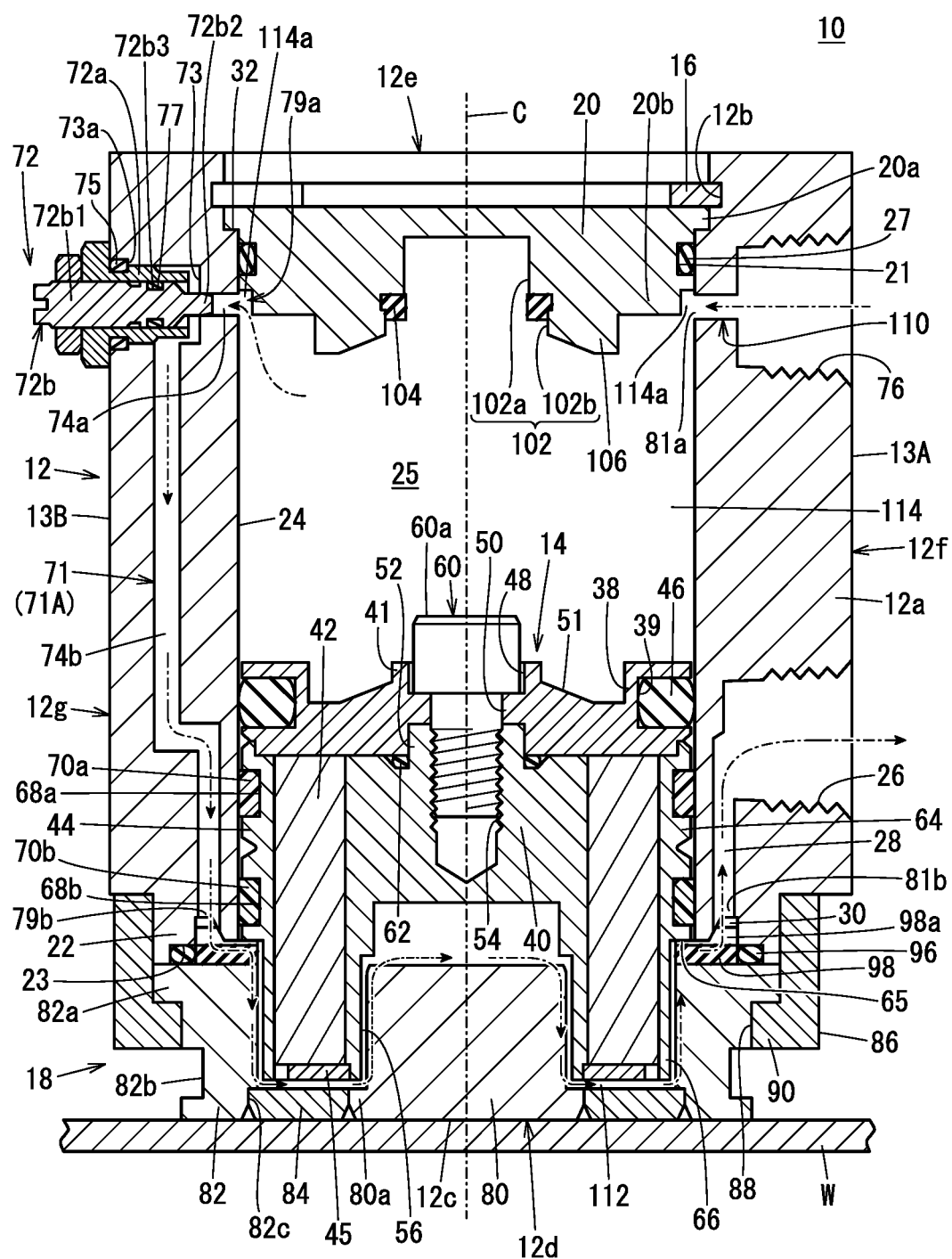
FIG. 3 is a cross-sectional view showing the magnetic chuck according to the first embodiment.
Figure 4:
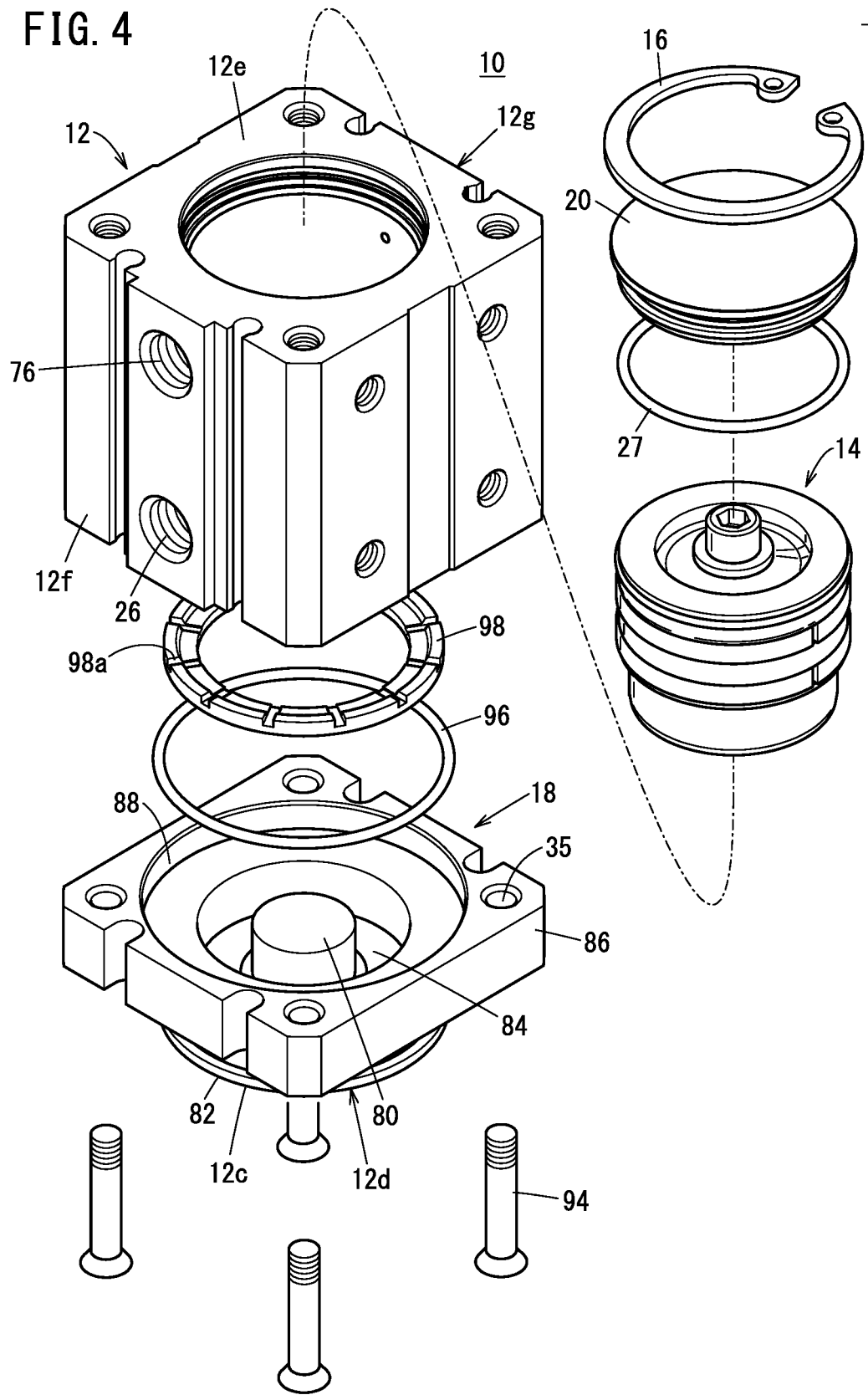
FIG. 4 is an exploded perspective view showing the magnetic chuck according to the first embodiment.

A magnetic chuck according to a first embodiment will be described with reference to FIGS. 1 to 4. FIG. 1 is a front view showing a magnetic chuck according to the present embodiment. FIGS. 2 and 3 are cross-sectional views showing the magnetic chuck according to the present embodiment. FIG. 2 shows a state in which a piston assembly 14 at the top dead center. FIG. 3 shows a state in which the piston assembly 14 at the bottom dead center. FIG. 3 also shows a state in which a workpiece W is attracted to a magnetic chuck 10. FIG. 4 is an exploded perspective view showing the magnetic chuck according to the present embodiment. In the specification of the present application, the surface of the magnetic chuck 10 on the upper side of FIG. 1 is referred to as an upper surface, and the surface of the magnetic chuck 10 on the lower side of FIG. 1 is referred to as a lower surface. The workpiece W is attracted to the lower surface side of the magnetic chuck 10.

As shown in FIGS. 2 and 3, the magnetic chuck 10 according to the present embodiment includes a cylinder tube 12, the piston assembly 14, a bottom cover 18, and a latch yoke 20. The magnetic chuck 10, for example, is disposed on a distal end arm of a non-illustrated robot.

A cylinder hole 24 is formed in the cylinder tube 12. The cylinder hole 24 passes through the cylinder tube 12. The cylinder hole 24 has, for example, a circular shape in transverse section. That is, the transverse sectional shape of the cylinder hole 24 in the direction perpendicular to a central axis C of the cylinder tube 12 is, for example, circular. The central axis of the cylinder hole 24 coincides with the central axis C of the cylinder tube 12. As a material of the cylinder tube 12, for example, a paramagnetic metal such as an aluminum alloy is used, but the material is not limited thereto.

As shown in FIG. 1, the cylinder tube 12 includes a first end portion 12d and a second end portion 12e. The first end portion 12d and the second end portion 12e are positioned opposite to each other. The first end portion 12d includes a workpiece attraction surface 12c to which the workpiece W is attracted. As shown in FIGS. 2 and 3, a fitting portion 22 to be fitted to a housing 86 described later is formed on the first end portion 12d of the cylinder tube 12. The portion of the cylinder tube 12 excluding the fitting portion 22 has, for example, a rectangular outline in transverse section. The portion of the cylinder tube 12 excluding the fitting portion 22 has, for example, a circular outline in transverse section.

A step 23 to which a second seal member 96 (described later) is attached is formed on the end of the fitting portion 22 of the cylinder tube 12. A step 32 is formed on the upper side of the cylinder hole 24. The step 32 engages with a flange 20a (described later) formed on the latch yoke 20.

The piston assembly 14 includes a seal holder 38, a core yoke 40, a permanent magnet 42, a cover yoke 44, and a ring plate 45.

The seal holder 38 is shaped like a disk. As a material of the seal holder 38, for example, a paramagnetic metal such as an aluminum alloy is used, but the material is not limited thereto. A recessed groove 39 is formed on the outer periphery of the seal holder 38. The recessed groove 39 opens outward in the circumferential direction of the seal holder 38. A piston seal 46 is mounted in the recessed groove 39. As a material of the piston seal 46, for example, fluoro rubber or the like is used, but the material is not limited thereto. The piston seal 46 is in sliding contact with the wall surface of the cylinder hole 24. A through hole 48 is formed in the center of the seal holder 38. An inward flange 50 projecting toward the center of the through hole 48 is formed in the through hole 48. An annular recess 51 is formed in the upper surface of the seal holder 38. The annular recess 51 opens toward the upper surface side of the magnetic chuck 10. A portion existing between the through hole 48 and the annular recess 51 forms a flange 41. The flange 41 protrudes toward the upper surface side of the magnetic chuck 10.

The core yoke 40 is formed in a round pillar shape as a whole. As a material of the core yoke 40, for example, steel or the like which is a ferromagnetic material is used, but the material is not limited thereto. A tubular protrusion 52 is formed in the center of the upper end portion of the core yoke 40. The tubular protrusion 52 protrudes toward the upper surface side of the magnetic chuck 10. A bottomed screw hole 54 is formed in the core yoke 40. The screw hole 54 opens at the distal end of the tubular protrusion 52. A recess 56 is formed on the lower side of the core yoke 40. The recess 56 opens toward the lower surface side of the magnetic chuck 10. The recess 56 has, for example, a circular shape in transverse section.

The tubular protrusion 52 of the core yoke 40 is inserted into the through hole 48 formed in the seal holder 38. The tubular protrusion 52 is inserted into a lower portion of the through hole 48. The tubular protrusion 52 is fitted into the through hole 48. The tubular protrusion 52 abuts against the inward flange 50 of the seal holder 38. A fixing screw 60 is inserted into the through hole 48. The fixing screw 60 is inserted from the upper side of the through hole 48. The fixing screw 60 is further inserted into the screw hole 54 formed in the core yoke 40. The fixing screw 60 is screwed into the screw hole 54. Thus, the seal holder 38 and the core yoke 40 are integrally joined together.

A first seal member 62 is attached around the base of the tubular protrusion 52 of the core yoke 40. The first seal member 62 provides a seal between the seal holder 38 and the core yoke 40. As a material of the first seal member 62, for example, fluoro rubber or the like is used, but the material is not limited thereto.

The permanent magnet 42 is formed in a round tube shape, for example. The permanent magnet 42 is positioned on the outer periphery of the core yoke 40. As the permanent magnet 42, for example, a samarium-cobalt magnet is used, but the permanent magnet 42 is not limited thereto. The permanent magnet 42 is surrounded by the seal holder 38, the core yoke 40, the cover yoke 44, and the ring plate 45. The permanent magnet 42 is magnetized in a radial direction, for example. The permanent magnet 42 has a north pole on its inner peripheral side, for example, and a south pole on its outer peripheral side, for example. The permanent magnet 42 may have a south pole on its inner peripheral side, and a north pole on its outer peripheral side. The permanent magnet 42 is divided in the circumferential direction, for example. That is, the round tube-shaped permanent magnet 42 is formed by combining a plurality of fan-shaped magnet pieces (not shown). The permanent magnet 42 may be formed of a single member. The permanent magnet 42 is not limited to a round tube shape. For example, the permanent magnet 42 may be formed in a polygonal tube shape. That is, the polygonal tube-shaped permanent magnet 42 may be formed by combining a plurality of flat plate-shaped magnet pieces.

The cover yoke 44 is formed in a tubular shape. The cover yoke 44 is positioned on the outer periphery of the permanent magnet 42. As a material of the cover yoke 44, for example, steel or the like which is a ferromagnetic material is used, but the material is not limited thereto. The outer periphery of the cover yoke 44 has a large diameter on the upper side and a small diameter on the lower side. That is, the cover yoke 44 includes a large-diameter portion 64 and a small-diameter portion 66. There is a step 65 between the large-diameter portion 64 and the small-diameter portion 66. Two annular grooves 68a and 68b are formed in the large-diameter portion 64. The annular grooves 68a and 68b open outward in the radial direction of the cover yoke 44. The annular grooves 68a and 68b are spaced apart from each other in the direction along a central axis C of the cylinder tube 12. Wear rings 70a and 70b are attached to the annular grooves 68a and 68b, respectively. The piston assembly 14 is guided and supported in the cylinder hole 24 with the wear rings 70a, 70b therebetween. As a material of the wear rings 70a, 70b, for example, polytetrafluoroethylene (PTFE) or the like is used. The material of the wear rings 70a and 70b is not limited to such a material.

The bottom cover 18 includes a bottom yoke 80, an outer yoke 82, and the housing 86.

As a material of the bottom yoke 80, for example, steel or the like which is a ferromagnetic material is used, but the material is not limited thereto. The bottom yoke 80 has, for example, a round pillar shape. As the piston assembly 14 descends, the bottom yoke 80 enters the recess 56 of the core yoke 40 (see FIG. 3). A bottom flange 80a is formed at the bottom of the bottom yoke 80. The bottom flange 80a protrudes outward in the radial direction of the bottom yoke 80.

The outer yoke 82 is provided around the bottom yoke 80. As a material of the outer yoke 82, for example, steel or the like which is a ferromagnetic material is used, but the material is not limited thereto. The outer yoke 82 is formed in a round tube shape, for example. An upper flange 82a is formed on the upper side of the outer yoke 82. The upper flange 82a protrudes outward in the radial direction of the outer yoke 82. An outer peripheral recess 82b is formed on the outer peripheral surface of the lower portion side of the outer yoke 82. The outer peripheral recess 82b is recessed inward in the radial direction of the outer yoke 82. A step 82c is formed on the inner peripheral surface of the lower side of the outer yoke 82.

A ring-shaped joint plate 84 is attached between the bottom flange 80a of the bottom yoke 80 and the step 82c of the outer yoke 82. The outer yoke 82 is fixed to the bottom yoke 80 by the joint plate 84. As a material of the joint plate 84, for example, a paramagnetic metal such as an aluminum alloy is used, but the material is not limited thereto.

The housing 86 is formed in a tubular shape, for example. As a material of the housing 86, for example, a paramagnetic metal such as an aluminum alloy is used, but the material is not limited thereto. A through hole 88 is formed in the housing 86 so as to penetrate the housing 86 in the vertical direction. The through hole 88 has a circular shape in transverse section. A lower flange 90 is formed on the lower side of the through hole 88. The lower flange 90 protrudes inward in the radial direction of the through hole 88. The fitting portion 22 of the cylinder tube 12 is fitted in the through hole 88 of the housing 86.

As shown in FIG. 4, four tie rods 94 are inserted through insertion holes 35 formed in the housing 86. A distal end portion of each of the tie rods 94 is screwed into a screw hole (not shown) formed in the cylinder tube 12. In this way, the cylinder tube 12 and the housing 86 are joined and fixed together. The upper flange 82a of the outer yoke 82 is held between the end surface of the fitting portion 22 of the cylinder tube 12 and the lower flange 90 of the housing 86. In this way, the outer yoke 82 is joined and fixed to the cylinder tube 12 or the like.

As described above, the step 23 is formed at the distal end of the fitting portion 22 of the cylinder tube 12. The second seal member 96 is mounted in a gap between the step 23 and the upper surface of the outer yoke 82. The second seal member 96 provides a seal between the cylinder tube 12 and the outer yoke 82. As a material of the second seal member 96, for example, fluoro rubber or the like is used, but the material is not limited thereto.

A damper (lower damper 98) is mounted between the lower end of the cylinder tube 12 and the upper surface of the outer yoke 82. The lower damper 98 is formed in an annular shape. As a material of the lower damper 98, for example, fluoro rubber or the like is used, but the material is not limited thereto. The upper surface of the lower damper 98 faces an annular recess 30 formed in the cylinder tube 12. When the piston assembly 14 has descended to the bottom dead center, the step 65 of the cover yoke 44 abuts on the lower damper 98 as shown in FIG. 3. The lower damper 98 serves to alleviate the shock generated when the piston assembly 14 is moved within an internal space 25. That is, the lower damper 98 serves to alleviate the shock when the piston assembly 14 has descended to the bottom dead center. As shown in FIG. 4, a plurality of grooves 98a (a plurality of recessed grooves) are formed in the upper surface of the lower damper 98, and extend from the inner peripheral end of the lower damper 98 to the outer peripheral end of the lower damper 98. The plurality of grooves 98a are formed, for example, at equal intervals in the circumferential direction of the lower damper 98. The grooves 98a serve to allow a first fluid supply/discharge hole 28 described later to communicate with the cylinder hole 24. That is, the grooves 98a serve to allow a first supply/discharge port 26 described later to communicate with a first pressure chamber 112 described later. Even when the piston assembly 14 is positioned at the bottom dead center, the first fluid supply/discharge hole 28 communicates with the cylinder hole 24 via the grooves 98a. The grooves 98a also serve to allow a second communication hole 74b described later to communicate with the cylinder hole 24. That is, the grooves 98a also serves to allow a first communication passage 71A described later to communicate with the first pressure chamber 112.

The workpiece W is attracted to the lower surface of the magnetic chuck 10. Examples of the workpiece W include a plate made of iron, but are not limited thereto.

The latch yoke 20 is formed in a disk shape. As a material of the latch yoke 20, for example, steel or the like which is a ferromagnetic material is used, but the material is not limited thereto. The flange 20a is formed on the upper side of the latch yoke 20. The flange 20a protrudes outward in the radial direction of the latch yoke 20. The flange 20a is engaged with a step 32 formed on the upper side of the cylinder hole 24. A recess 102 is formed in the center of the latch yoke 20. The recess 102 opens toward the lower surface side of the magnetic chuck 10. The recess 102 has, for example, a circular shape in transverse section. The recess 102 includes a small-diameter portion 102a and a large-diameter portion 102b. The small-diameter portion 102a is located on the upper side of the recess 102. The large-diameter portion 102b is located on the lower side of the recess 102. When the piston assembly 14 rises, a head 60a of the fixing screw 60 is received within the small-diameter portion 102a (see FIG. 2). An upper damper 104 is attached to the large-diameter portion 102b. The upper damper 104 is formed in an annular shape. When the piston assembly 14 rises, the flange 41 of the seal holder 38 abuts on the upper damper 104 as shown in FIG. 2. The upper damper 104 serves to alleviate the shock when the piston assembly 14 rises. As a material of the upper damper 104, for example, fluoro rubber or the like is used, but the material is not limited thereto. An annular projecting portion 106 is formed at the lower end of the large-diameter portion 102b. The inner diameter of the annular projecting portion 106 increases downward in a tapered shape. The annular projecting portion 106 enters an annular recess 51 formed in the seal holder 38 when the piston assembly 14 rises. A recessed groove 21 is formed on the outer periphery of the latch yoke 20. The recessed groove 21 opens outward in the radial direction of the latch yoke 20. A latch yoke seal 27 is mounted in the recessed groove 21. As a material of the latch yoke seal 27, for example, fluoro rubber or the like is used, but the material is not limited thereto. A small-diameter portion 20b is formed on the lower side of the latch yoke 20. There is a gap 114a between the outer peripheral surface of the small-diameter portion 20b of the latch yoke 20 and the wall surface of the cylinder hole 24. The gap 114a is a part of a second pressure chamber 114 described later.

A recessed groove 12b is formed on the upper side of the cylinder tube 12. The recessed groove 12b opens toward the central axis C of the cylinder tube 12. A snap ring 16 is fitted to the recessed groove 12b. The snap ring 16 is a retaining ring for preventing the latch yoke 20 from coming off in the axial direction of the cylinder tube 12. The axial direction of the cylinder tube 12 is a direction along the central axis C. As a material of the snap ring 16, for example, spring steel is used, but the material is not limited thereto.

The internal space 25 of the cylinder tube 12 is divided into the first pressure chamber 112 and the second pressure chamber 114 by the piston assembly 14. The first pressure chamber 112 is a pressure chamber located below the piston seal 46 of the seal holder 38. The second pressure chamber 114 is a pressure chamber located above the piston seal 46 of the seal holder 38. The first pressure chamber 112 is located between the second pressure chamber 114 and the workpiece attraction surface 12c.

The first supply/discharge port 26 is formed in the cylinder tube 12 for supplying/discharging fluid to/from the first pressure chamber 112. The cylinder tube 12 includes a first side portion 12f and a second side portion 12g. The first side portion 12f and the second side portion 12g are positioned opposite to each other with respect to the central axis C of the cylinder tube 12. The first supply/discharge port 26 is provided in the first side portion 12f of the cylinder tube 12. The cylinder tube 12 has a first side surface 13A and a second side surface 13B. The first side surface 13A and the second side surface 13B are positioned opposite to each other. The first supply/discharge port 26 opens at the first side surface 13A of the cylinder tube 12. As the fluid, for example, a gas such as air is used, but the fluid is not limited thereto. A liquid such as water or oil may be used as the fluid. The temperature of the fluid is, for example, room temperature (about 25 degrees Celsius), but is not limited thereto. However, in order to sufficiently cool the inside of the magnetic chuck 10, it is preferable for the temperature of the fluid to be sufficiently lower than the temperature of the workpiece W.

The first fluid supply/discharge hole 28 is formed inside a wall 12a of the cylinder tube 12. The first supply/discharge port 26 is connected to the upper end of the first fluid supply/discharge hole 28. The first fluid supply/discharge hole 28 extends in the axial direction of the cylinder tube 12 inside the wall 12a of the cylinder tube 12. The annular recess 30 that opens toward the lower surface side of the magnetic chuck 10 is formed on the inner peripheral side of the fitting portion 22. The lower end of the first fluid supply/discharge hole 28 reaches the annular recess 30. The first supply/discharge port 26 communicates with the first pressure chamber 112 via the first fluid supply/discharge hole 28. The first fluid supply/discharge hole 28 has an opening 81b communicating with the first pressure chamber 112. The opening 81b communicating with the first pressure chamber 112 is provided on the first side portion 12f of the cylinder tube 12.

The cylinder tube 12 is provided with a second supply/discharge port 76 for supplying/discharging fluid to/from the second pressure chamber 114. Similarly to the first supply/discharge port 26, the second supply/discharge port 76 is provided in the first side portion 12f of the cylinder tube 12. The second supply/discharge port 76 opens at the first side surface 13A of the cylinder tube 12. The second supply/discharge port 76 is located above the first supply/discharge port 26.

A second fluid supply/discharge hole 110 is formed inside the wall 12a of the cylinder tube 12. One end of the second fluid supply/discharge hole 110 is connected to the second supply/discharge port 76. The second fluid supply/discharge hole 110 extends inside the wall 12a of the cylinder tube 12 toward the cylinder hole 24. The other end of the second fluid supply/discharge hole 110 communicates with the gap 114a formed between the outer peripheral surface of the small-diameter portion 20b of the latch yoke 20 and the wall surface of the cylinder hole 24. As described above, the gap 114a is a part of the second pressure chamber 114. The second supply/discharge port 76 communicates with the second pressure chamber 114 via the second fluid supply/discharge hole 110. The second fluid supply/discharge hole 110 has an opening 81a communicating with the second pressure chamber 114. The opening 81a communicating with the second pressure chamber 114 is provided on the first side portion 12f of the cylinder tube 12.

In the cylinder tube 12, a communication passage 71 is formed for allowing the first pressure chamber 112 and the second pressure chamber 114 to communicate with each other. The communication passage 71 includes the first communication passage 71A. The first communication passage 71A is formed inside the wall 12a of the cylinder tube 12. The first communication passage 71A is formed separately from the internal space 25 of the cylinder tube 12. The first communication passage 71A is provided in the second side portion 12g of the cylinder tube 12. As described above, the first side portion 12f and the second side portion 12g are opposite to each other with respect to the central axis C of the cylinder tube 12. The first supply/discharge port 26 and the second supply/discharge port 76 are provided in the first side portion 12f of the cylinder tube 12, and the first communication passage 71A is provided in the second side portion 12g of the cylinder tube 12. The reason why the first supply/discharge port 26 and the second supply/discharge port 76 are disposed on the first side portion 12f of the cylinder tube 12 and the communication passage 71 is disposed on the second side portion 12g of the cylinder tube 12 is as follows. That is, they are disposed so as to suppress the stagnation of the fluid in the first pressure chamber 112 and the second pressure chamber 114, and to effectively cool each part of the magnetic chuck 10 by the fluid.

The first communication passage 71A is provided with a flow rate regulating valve 72, more specifically, a needle valve, for regulating the flow rate of the fluid flowing through the first communication passage 71A. As described above, the second end portion 12e of the cylinder tube 12 is located opposite to the first end portion 12d including the workpiece attraction surface 12c. The flow rate regulating valve 72 is provided on the second end portion 12e. The flow rate regulating valve 72 is mounted in a recess 73 formed in the cylinder tube 12. The recess 73 opens outward in the radial direction of the cylinder tube 12. The recess 73 opens at the second side surface 13B of the cylinder tube 12. The depth direction of the recess 73 is the radial direction of the cylinder tube 12. The cross sectional shape of the recess 73 in the axial direction of the cylinder tube 12 is, for example, circular. A step 73a to which a seal member 75 described later is attached is formed in the recess 73. The seal member 75 is mounted in a gap between the step 73a and the flow rate regulating valve 72. The seal member 75 provides a seal between the cylinder tube 12 and the flow rate regulating valve 72. As a material of the seal member 75, for example, fluoro rubber or the like is used, but the material is not limited thereto.

The first communication passage 71A includes a first communication hole 74a and the second communication hole 74b. One end of the first communication hole 74a communicates with the gap 114a formed between the outer peripheral surface of the small-diameter portion 20b of the latch yoke 20 and the wall surface of the cylinder hole 24. The first communication hole 74a, that is, the communication hole has an opening 79a communicating with the second pressure chamber 114. The opening 79a communicating with the second pressure chamber 114 is provided on the second side portion 12g of the cylinder tube 12. Another end of the first communication hole 74a opens at the bottom surface of the recess 73. The central axis of the first communication hole 74a coincides with the central axis of the flow rate regulating valve 72. The upper end of the second communication hole 74b opens at the side surface of the recess 73. The second communication hole 74b extends inside the wall 12a of the cylinder tube 12 toward the lower side of the cylinder tube 12. The lower end of the second communication hole 74b reaches an annular recess 30 formed in the cylinder tube 12. The first communication passage 71A communicates with the first pressure chamber 112 via a groove 98a formed in the lower damper 98. That is, the second communication hole 74b has an opening 79b communicating with the first pressure chamber 112. The opening 79b communicating with the first pressure chamber 112 is provided on the second side portion 12g of the cylinder tube 12.

The flow rate regulating valve 72 includes a body portion 72a and a core rod 72b. The body portion 72a is formed in a round tube shape as a whole. The core rod 72b is formed in a round pillar shape as a whole. The core rod 72b is surrounded by the body portion 72a. The core rod 72b includes a large-diameter portion 72b1 and a small-diameter portion 72b2. The small-diameter portion 72b2 is located at the distal end of the core rod 72b. The small-diameter portion 72b2 of the core rod 72b, that is, the tip end of the core rod 72b is inserted into the first communication hole 74a. When the core rod 72b is rotated, the core rod 72b is displaced in the longitudinal direction of the core rod 72b. When the core rod 72b is displaced in the longitudinal direction of the core rod 72b, the size of the gap between the first communication passage 71A and the core rod 72b changes, and the flow rate of the fluid in the first communication passage 71A is adjusted. When the piston assembly 14 is driven, the size of the gap between the first communication passage 71A and the core rod 72b is set to be sufficiently small such that a sufficient differential pressure can be generated between the first pressure chamber 112 and the second pressure chamber 114. An annular groove 72b3 is formed in the core rod 72b. The annular groove 72b3 opens outward in the radial direction of the core rod 72b. A seal member 77 is attached to the annular groove 72b3. The seal member 77 provides a seal between the body portion 72a and the core rod 72b. As a material of the seal member 77, for example, fluoro rubber or the like is used, but the material is not limited thereto.

The first supply/discharge port 26 and the first communication passage 71A communicate with each other via the first pressure chamber 112. Even when the piston assembly 14 is located at the bottom dead center, the state is kept, in which the first supply/discharge port 26 and the first communication passage 71A communicate with each other via the first pressure chamber 112 as shown in FIG. 3.

The second supply/discharge port 76 and the first communication passage 71A communicate with each other via the second pressure chamber 114. Even when the piston assembly 14 is located at the top dead center, the state is kept, in which the second supply/discharge port 76 and the first communication passage 71A communicate with each other via the second pressure chamber 114 as shown in FIG. 2.

In this way, the magnetic chuck 10 according to the present embodiment is configured.

Next, the operation of the magnetic chuck 10 according to the present embodiment will be described with reference to FIGS. 2 and 3. The state shown in FIG. 2, that is, the state in which the piston assembly 14 is positioned at the top dead center (rising end) is defined as an initial state.

When the piston assembly 14 is positioned at the top dead center, the piston assembly 14 including the permanent magnet 42 is attracted to the latch yoke 20 by a predetermined magnetic attraction force.

During transportation before the magnetic chuck 10 is brought into use, for example, the piston assembly 14 is held in the position of the top dead center by the function of the latch yoke 20, even if no fluid is being supplied to the magnetic chuck 10. It is thus possible to avoid the unexpected situation in which the magnetic chuck 10 attracts neighboring iron materials etc., which ensures safety.

Next, while maintaining the magnetic chuck 10 in the initial state, a robot (not shown) is driven, for example, to bring the magnetic chuck 10 into contact with a workpiece W. More specifically, the lower surface side of the magnetic chuck 10 is brought into contact with the workpiece W.

Next, by operating a switching valve (not shown), the supply of the fluid into the second pressure chamber 114 is started, and the discharge of the fluid from the first pressure chamber 112 is started. The fluid is supplied into the second pressure chamber 114 via the second supply/discharge port 76. The fluid is discharged from the first pressure chamber 112 via the first supply/discharge port 26.

When the supply of the fluid into the second pressure chamber 114 is started and the discharge of the fluid from the first pressure chamber 112 is started, a differential pressure is generated between the first pressure chamber 112 and the second pressure chamber 114. Therefore, a force to drive the piston assembly 14 downward acts on the piston assembly 14 in accordance with the differential pressure between the first pressure chamber 112 and the second pressure chamber 114. While the force to drive the piston assembly 14 downward does not exceed the magnetic attraction force acting between the latch yoke 20 and the piston assembly 14, the piston assembly 14 is held at the top dead center. As described above, since the size of the gap between the core rod 72b of the flow rate regulating valve 72 and the first communication passage 71A is set to be sufficiently small, the internal pressure of the second pressure chamber 114 becomes sufficiently higher than the internal pressure of the first pressure chamber 112. When the force to drive the piston assembly 14 downward exceeds the magnetic attraction force acting between the latch yoke 20 and the piston assembly 14, the piston assembly 14 begins to descend.

As the piston assembly 14 descends, the magnetic attraction force acting between the latch yoke 20 and the piston assembly 14 gradually becomes smaller. On the other hand, the magnetic attraction force acting between the bottom yoke 80 and the piston assembly 14 and the magnetic attraction force acting between the outer yoke 82 and the piston assembly 14 becomes larger gradually.

As the piston assembly 14 further descends, the bottom yoke 80 enters into the recess 56 of the core yoke 40. Thereafter, the step 65 of the cover yoke 44 comes into contact with the lower damper 98, and the piston assembly 14 reaches the bottom dead center (bottom end). In a state in which the piston assembly 14 is positioned at the bottom dead center, the magnetic flux density passing through the workpiece W becomes maximum, and so the workpiece W is attracted and held by the magnetic chuck 10 with the maximum magnetic attraction force.

The workpiece W may be at about room temperature or at a high temperature. When the workpiece W is attracted and held by the magnetic chuck 10, the heat of the workpiece W is transmitted to the magnetic chuck 10. For example, fluoro rubber or the like used as the material of the first seal member 62, the second seal member 96, the piston seal 46, the lower damper 98, and the like does not necessarily withstand extremely high temperatures. When the temperatures of the first seal member 62, the second seal member 96, the piston seal 46, the lower damper 98, and the like become extremely high, there is a possibility that the first seal member 62, the second seal member 96, the piston seal 46, the lower damper 98, and the like are damaged. On the other hand, in the present embodiment, since the first pressure chamber 112 and the second pressure chamber 114 communicate with each other via the communication passage 71 (the first communication passage 71A), the fluid continues to flow in the first pressure chamber 112 even when the piston assembly 14 is positioned at the bottom dead center. Therefore, according to the present embodiment, the magnetic chuck 10 can be cooled by the fluid, and damage to the first seal member 62, the second seal member 96, the piston seal 46, the lower damper 98, and the like can be suppressed.

With the piston assembly 14 positioned at the bottom dead center, the workpiece W is conveyed to a predetermined position. That is, the workpiece W is conveyed to the predetermined position in a state where the magnetic chuck 10 attracts and holds the workpiece W. Thereafter, an operation for releasing the workpiece W from the magnetic chuck 10 is performed. An operation for releasing the workpiece W from the magnetic chuck 10 is performed by operating a switching valve (not shown). Specifically, the supply of the fluid into the first pressure chamber 112 is started, and the discharge of the fluid from the second pressure chamber 114 is started. Even in a state in which the fluid is supplied into the first pressure chamber 112 and the fluid is discharged from the second pressure chamber 114, the fluid continues to flow into the first pressure chamber 112. Therefore, even in a state where the fluid is supplied into the first pressure chamber 112 and the fluid is discharged from the second pressure chamber 114, the magnetic chuck 10 is cooled by the fluid.

When the supply of the fluid into the first pressure chamber 112 is started and the discharge of the fluid from the second pressure chamber 114 is started, a force to drive the piston assembly 14 upward acts on the piston assembly 14 in accordance with the differential pressure between the first pressure chamber 112 and the second pressure chamber 114. The piston assembly 14 is positioned at the bottom dead center until the force to drive the piston assembly 14 upward exceeds the magnetic attraction force acting between the bottom yoke 80 and the piston assembly 14 and between the outer yoke 82 and the piston assembly 14. When the force to drive the piston assembly 14 upward exceeds the magnetic attraction force acting between the bottom yoke 80 and the piston assembly 14 and between the outer yoke 82 and the piston assembly 14, the piston assembly 14 begins to rise.

The magnetic attraction force acting on the workpiece W gradually becomes smaller as the piston assembly 14 moves upward, and the workpiece W is released from the attraction by the magnetic chuck 10. When the flange 41 of the seal holder 38 abuts against the upper damper 104, the upward movement of the piston assembly 14 is terminated. That is, the piston assembly 14 reaches the top dead center. Since the differential pressure between the first pressure chamber 112 and the second pressure chamber 114 is continuously applied to the piston assembly 14 in addition to the magnetic attraction force acting between the latch yoke 20 and the piston assembly 14, the piston assembly 14 is reliably held at the top dead center. Therefore, the piston assembly 14 is not lowered unexpectedly to attract the workpiece W. Even in a state where the piston assembly 14 is held at the top dead center, the fluid continues to flow in the first pressure chamber 112. Therefore, even in a state where the piston assembly 14 is held at the top dead center, the magnetic chuck 10 is cooled by the fluid.

As described above, according to the present embodiment, the first pressure chamber 112 and the second pressure chamber 114 communicate with each other via the communication passage 71 (first communication passage 71A). Therefore, according to the present embodiment, each part of the magnetic chuck 10 is cooled by the fluid continuously flowing through the internal space 25 of the cylinder tube 12. Even when the piston assembly 14 is positioned at the bottom dead center, the fluid continues to flow into the first pressure chamber 112 and the second pressure chamber 114. Therefore, according to the present embodiment, even when a high-temperature workpiece W is attracted by the magnetic chuck 10, damage to the first seal member 62, the second seal member 96, the piston seal 46, the lower damper 98, and the like can be suppressed. Therefore, according to the present embodiment, it is possible to provide the magnetic chuck 10 having good heat resistance.

Second Embodiment

Figure 5:
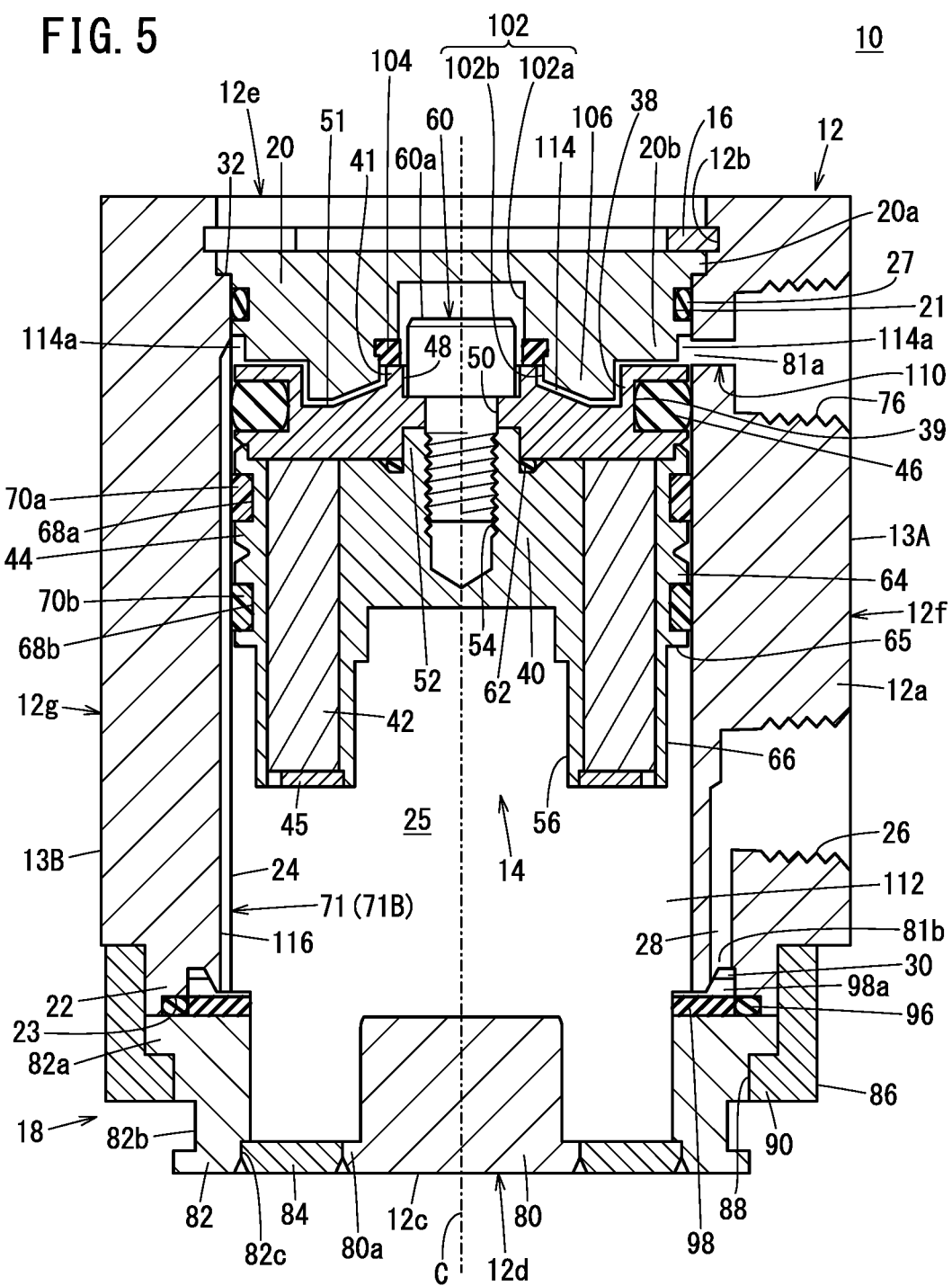
FIG. 5 is a sectional view showing a magnetic chuck according to a second embodiment.
Figure 6:
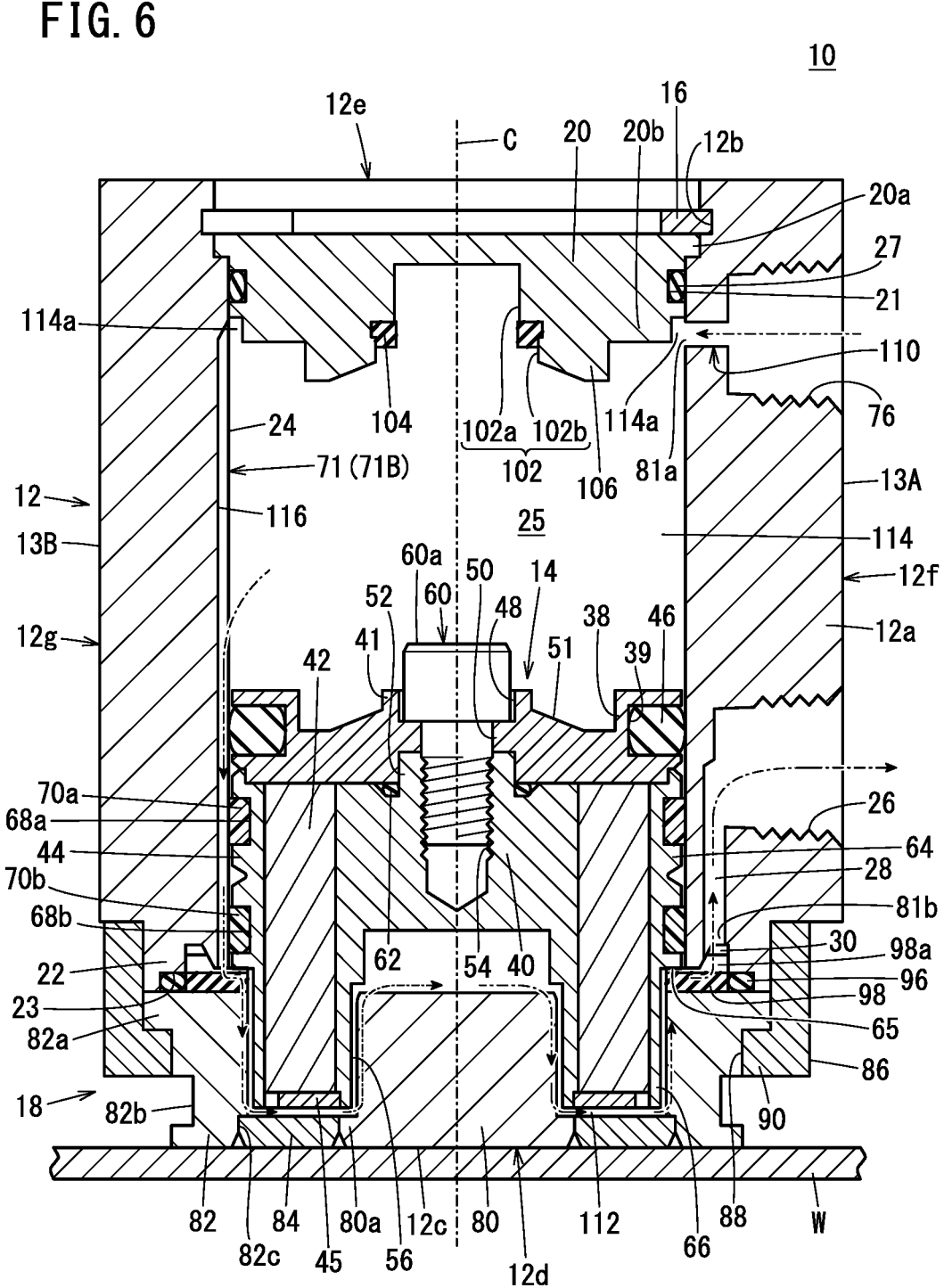
FIG. 6 is a cross-sectional view showing the magnetic chuck according to the second embodiment.

Next, a magnetic chuck according to a second embodiment will be described with reference to FIGS. 5 and 6. Constituent elements that are identical to those of the magnetic chuck according to the first embodiment shown in FIGS. 1 to 4 are denoted by the same reference numerals, and the description thereof will be omitted or simplified. FIGS. 5 and 6 are cross-sectional views showing the magnetic chuck according to the present embodiment. FIG. 5 shows a state in which the piston assembly 14 is positioned at the top dead center. FIG. 6 shows a state in which the piston assembly 14 is positioned at the bottom dead center.

As shown in FIGS. 5 and 6, a groove 116 is formed in the wall surface of the internal space 25 of the cylinder tube 12. In the present embodiment, a communication passage 71 (second communication passage 71B) that allows the first pressure chamber 112 and the second pressure chamber 114 to communicate with each other is configured by the groove 116. The depth and width of the groove 116 constituting the second communication passage 71B are set to be sufficiently small so that a sufficient differential pressure can be generated between the first pressure chamber 112 and the second pressure chamber 114 when the piston assembly 14 is driven. The second communication passage 71B is formed in the second side portion 12g of the cylinder tube 12, in a similar manner to the first communication passage 71A in the first embodiment. As described above, the first side portion 12f and the second side portion 12g are positioned opposite to each other with respect to the center axis C of the cylinder tube 12. The first supply/discharge port 26 and the second supply/discharge port 76 are provided in the first side portion 12f of the cylinder tube 12, and the second communication passage 71B is provided in the second side portion 12g of the cylinder tube 12.

The lower end of the groove 116 constituting the second communication passage 71B reaches the lower damper 98 in which the groove 98a is formed. The first supply/discharge port 26 and the second communication passage 71B communicate with each other via the first pressure chamber 112. Even when the piston assembly 14 is located at the bottom dead center, as shown in FIG. 6, the first supply/discharge port 26 and the second communication passage 71B are kept in communication with each other via the first pressure chamber 112.

The upper end of the groove 116 faces the outer peripheral surface of the small-diameter portion 20b of the latch yoke 20. As described above, a gap 114a is formed between the outer peripheral surface of the small-diameter portion 20b and the wall surface of the cylinder hole 24. As described above, the gap 114a is a part of the second pressure chamber 114. The second supply/discharge port 76 and the second communication passage 71B communicate with each other via the second pressure chamber 114. Even when the piston assembly 14 is positioned at the top dead center, as shown in FIG. 5, the second supply/discharge port 76 and the second communication passage 71B are kept in communication with each other via the second pressure chamber 114.

In the above description, the case where the second communication passage 71B is formed by the single groove 116 is described as an example, but the present invention is not limited thereto. A plurality of grooves 116 may constitute the second communication passage 71B. For example, the plurality of grooves 116 may be arranged at predetermined intervals in the circumferential direction of the cylinder hole 24.

In this way, the groove 116 formed in the wall surface of the internal space 25 of the cylinder tube 12 may constitute the communication passage 71 (second communication passage 71B). In this embodiment as well, each part of the magnetic chuck 10 is cooled by the fluid that continues to flow through the internal space 25 of the cylinder tube 12. That is, even when the piston assembly 14 is positioned at the bottom dead center, the fluid continues to flow into the first pressure chamber 112 and the second pressure chamber 114. Therefore, even when a high-temperature workpiece W is attracted by the magnetic chuck 10, damage to the first seal member 62, the second seal member 96, the piston seal 46, the lower damper 98, and the like can be suppressed. Therefore, also in this embodiment, the magnetic chuck 10 having good heat resistance can be provided.

Third Embodiment

Figure 7:
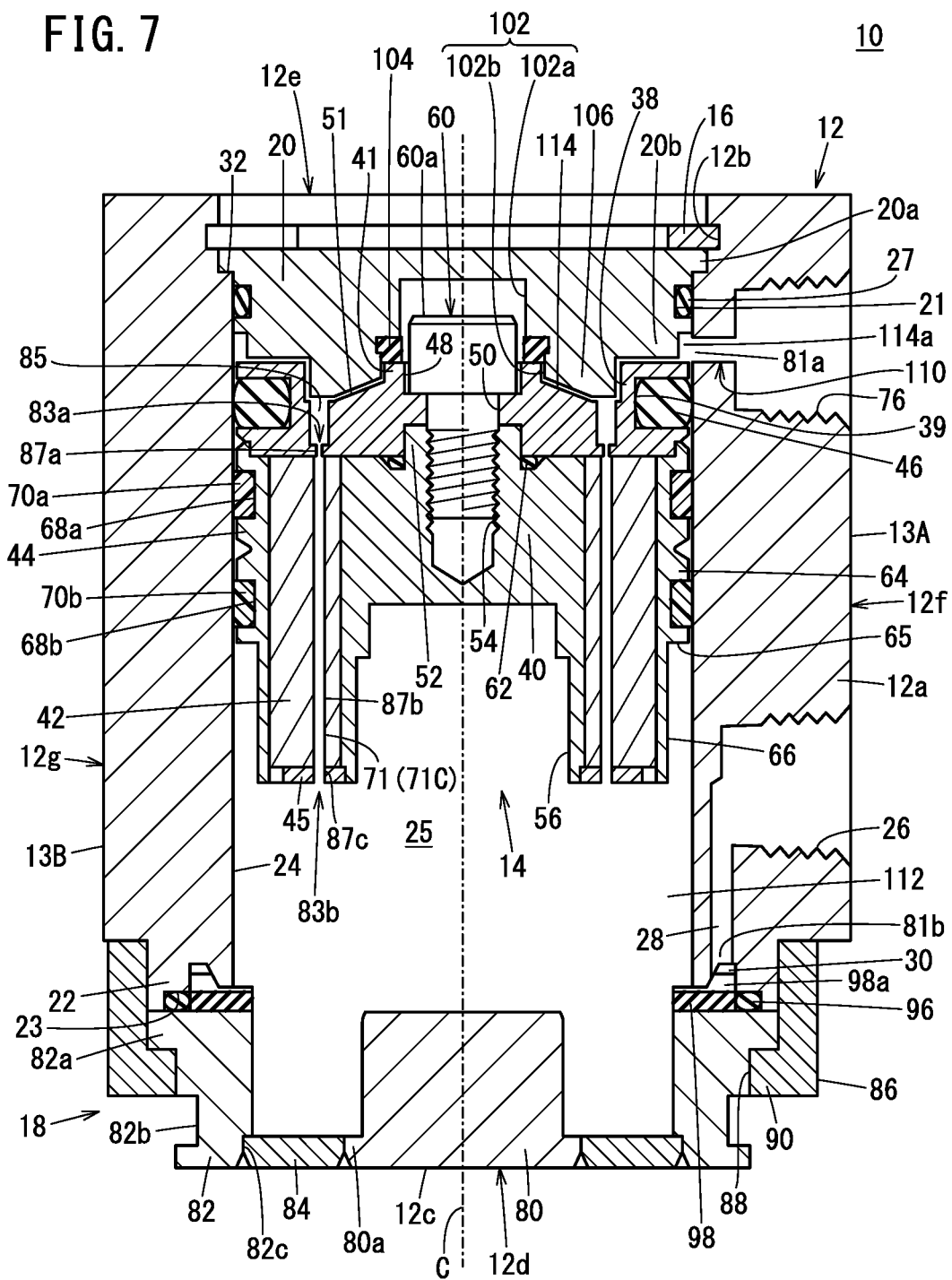
FIG. 7 is a cross-sectional view showing a magnetic chuck according to a third embodiment.
Figure 8:
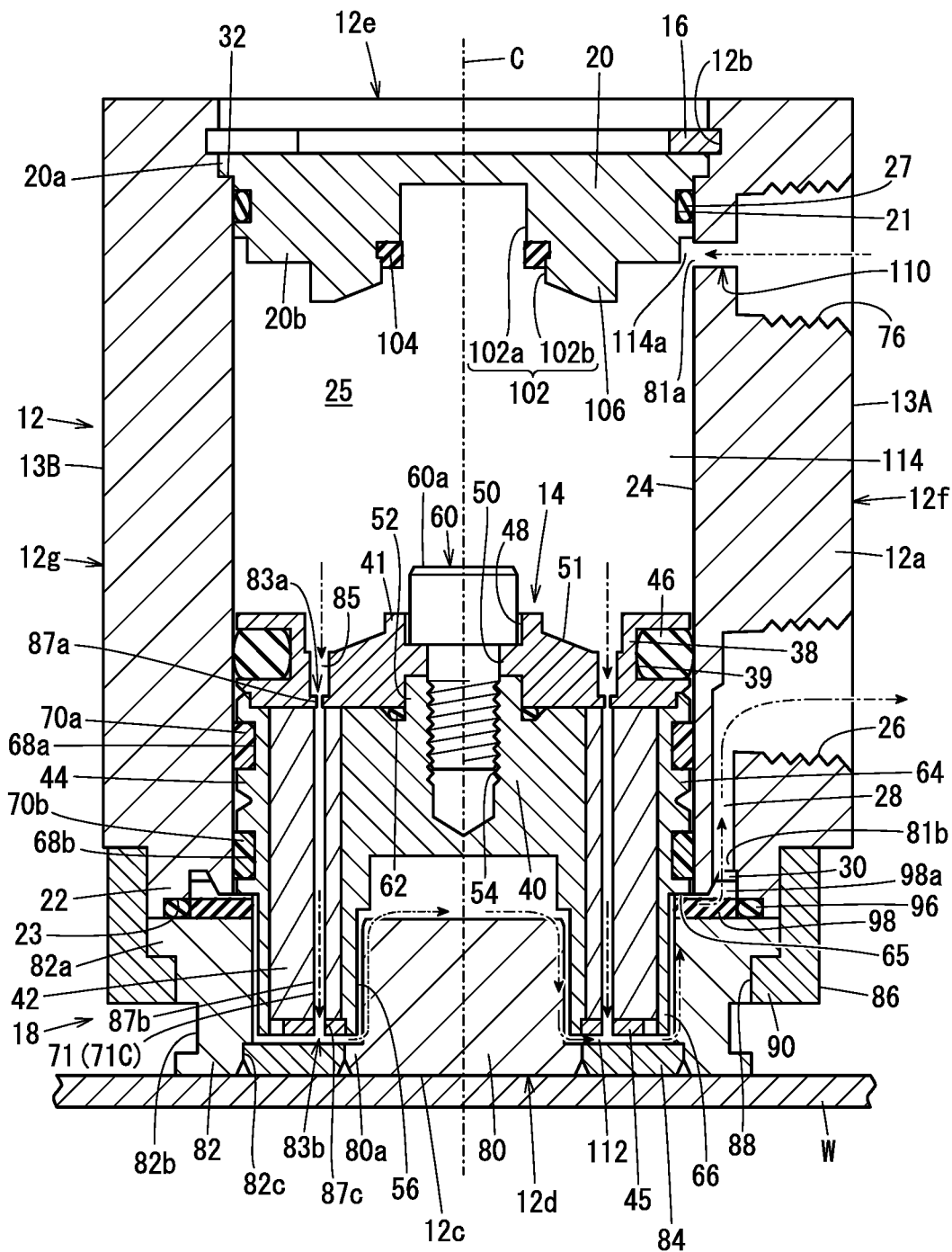
FIG. 8 is a cross-sectional view showing the magnetic chuck according to the third embodiment.

Next, a magnetic chuck according to a third embodiment will be described with reference to FIGS. 7 and 8. Constituent elements that are identical to those of the magnetic chuck according to the first or second embodiment shown in FIGS. 1 to 6 are denoted by the same reference numerals, and the description thereof will be omitted or simplified. FIGS. 7 and 8 are cross-sectional views showing the magnetic chuck according to the present embodiment. FIG. 7 shows a state in which the piston assembly 14 is positioned at the top dead center. FIG. 8 shows a state in which the piston assembly 14 is positioned at the bottom dead center.

As shown in FIGS. 7 and 8, round recesses 85 that open toward the upper surface side of the magnetic chuck 10 are formed in the seal holder 38. The round recesses 85 open at the bottom surface of the annular recess 51. The central axis of each of the round recesses 85 coincides with the central axis of a through hole 87a described later. FIGS. 7 and 8 show an example in which the plurality of round recesses 85 are formed in the circumferential direction of the piston assembly 14.

The piston assembly 14 further includes a communication passage 71 (third communication passage 71C) that allows the first pressure chamber 112 and the second pressure chamber 114 to communicate with each other. The third communication passage 71C is formed by connecting the through hole 87a passing through the seal holder 38, a through hole 87b passing through the permanent magnets 42, and a through hole 87c passing through the ring plate 45 to each other, but is not limited thereto. The third communication passage 71C includes an opening 83a communicating with the second pressure chamber 114 and an opening 83b communicating with the first pressure chamber 112. The diameter of the third communication passage 71C is set to be sufficiently small so that a sufficient differential pressure can be generated between the first pressure chamber 112 and the second pressure chamber 114 when the piston assembly 14 is driven. Here, the diameter of the through hole 87a is set to be sufficiently small so that a sufficient differential pressure can be generated between the first pressure chamber 112 and the second pressure chamber 114 when the piston assembly 14 is driven. The third communication passage 71C is formed at least between the central axis C and the second side portion 12g of the cylinder tube 12. As described above, the first side portion 12f and the second side portion 12g are positioned opposite to each other with respect to the central axis C of the cylinder tube 12. The first supply/discharge port 26 and the second supply/discharge port 76 are provided on the first side portion 12f of the cylinder tube 12, and the third communication passage 71C is provided at least between the central axis C of the cylinder tube 12 and the second side portion 12g. FIGS. 7 and 8 show an example in which the plurality of third communication passages 71C are formed in the circumferential direction of the piston assembly 14.

The first supply/discharge port 26 and the third communication passage 71C communicate with each other via the first pressure chamber 112. Even when the piston assembly 14 is positioned at the bottom dead center, as shown in FIG. 8, the first supply/discharge port 26 and the third communication passage 71C are kept in communication with each other via the first pressure chamber 112.

The second supply/discharge port 76 and the third communication passage 71C communicate with each other via the second pressure chamber 114. Even when the piston assembly 14 is positioned at the top dead center, as shown in FIG. 7, the second supply/discharge port 76 and the third communication passage 71C are kept in communication with each other via the second pressure chamber 114.

In this way, the communication passage 71 (third communication passage 71C) that allows the first pressure chamber 112 and the second pressure chamber 114 to communicate with each other may be formed in the piston assembly 14. In this embodiment as well, each part of the magnetic chuck 10 is cooled by the fluid that continues to flow through the internal space 25 of the cylinder tube 12. That is, even when the piston assembly 14 is positioned at the bottom dead center, the fluid continues to flow into the first pressure chamber 112 and the second pressure chamber 114. Therefore, even when a high-temperature workpiece W is attracted by the magnetic chuck 10, damage to the first seal member 62, the second seal member 96, the piston seal 46, the lower damper 98, and the like can be suppressed. Therefore, also in this embodiment, the magnetic chuck 10 having good heat resistance can be provided.

Fourth Embodiment

Figure 9:
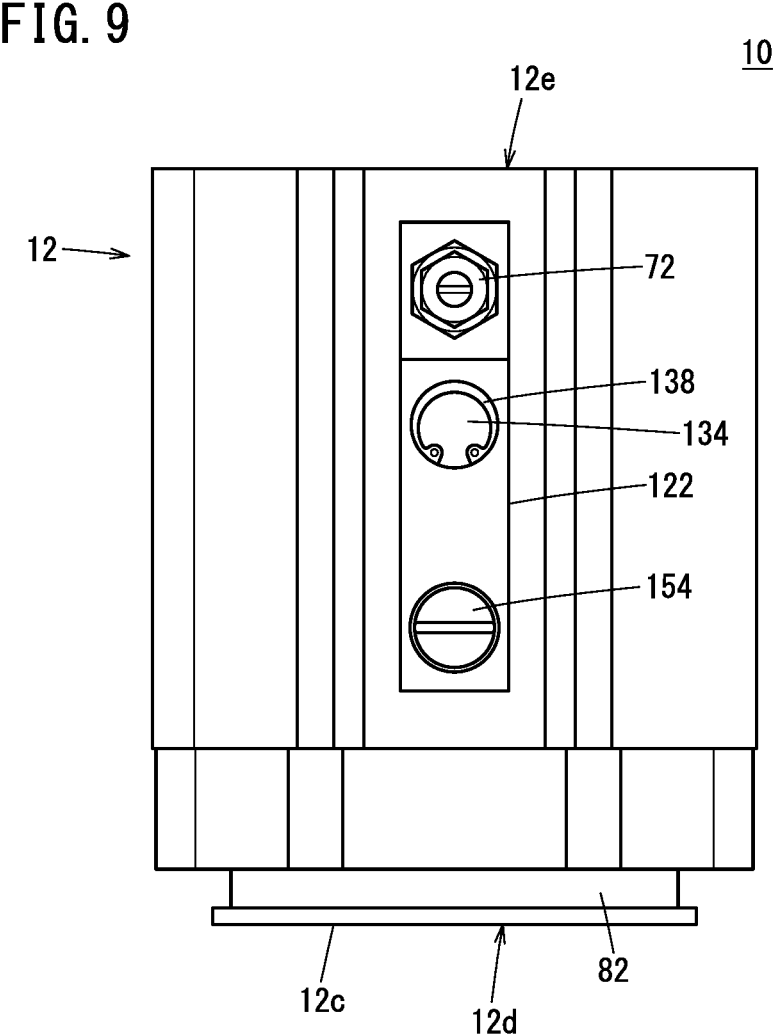
FIG. 9 is a rear view showing a magnetic chuck according to a fourth embodiment.
Figure 10:
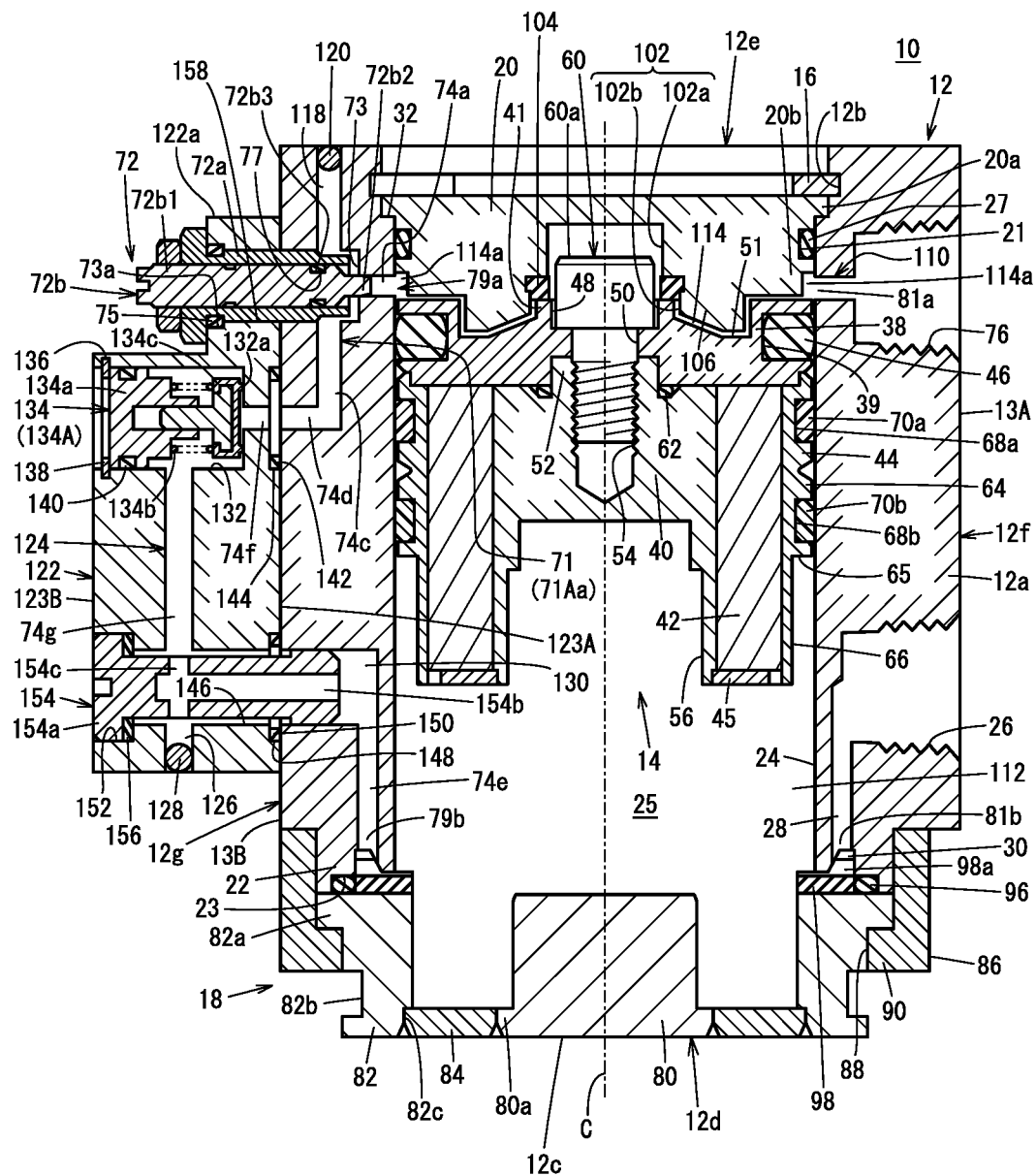
FIG. 10 is a cross-sectional view showing the magnetic chuck according to the fourth embodiment.
Figure 11:
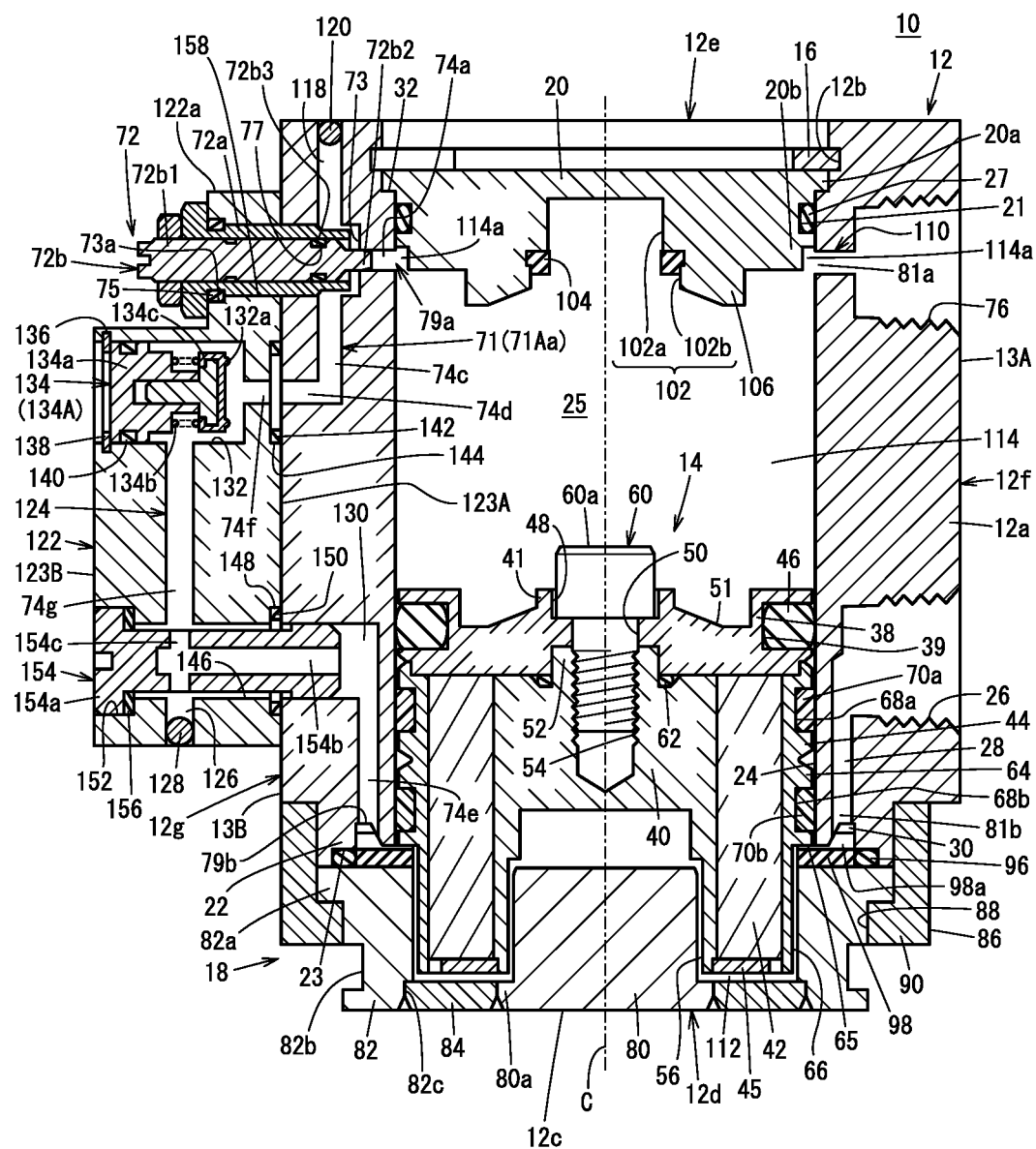
FIG. 11 is a cross-sectional view showing the magnetic chuck according to the fourth embodiment.

Next, a magnetic chuck according to a fourth embodiment will be described with reference to FIGS. 9 to 11. FIG. 9 is a rear view showing the magnetic chuck according to the present embodiment. FIGS. 10 and 11 are cross-sectional views showing the magnetic chuck according to the present embodiment. FIG. 10 shows a state in which the piston assembly 14 is positioned at the top dead center. FIG. 11 shows a state in which the piston assembly 14 is positioned at the bottom dead center. Constituent elements that are identical to those of the magnetic chucks according to the first to third embodiments shown in FIGS. 1 to 8 are denoted by the same reference numerals, and the description thereof will be omitted or simplified.

In the magnetic chuck 10 according to the present embodiment, a directional control valve 134 is provided on a first communication passage 71Aa.

In the cylinder tube 12, similarly to the cylinder tube 12 described above in the first to third embodiments, a communication passage 71 that communicates the first pressure chamber 112 and the second pressure chamber 114 is formed. The communication passage 71 includes the first communication passage 71Aa. A part of the first communication passage 71Aa is formed inside a wall 12a of the cylinder tube 12. The first communication passage 71Aa is formed separately from the internal space 25 of the cylinder tube 12. Similarly to the first communication passage 71Aa described above in the first embodiment, the first communication passage 71A is provided on the second side portion 12g of the cylinder tube 12.

The first communication passage 71Aa includes the first communication hole 74a. The first communication hole 74a in the present embodiment is the same as the first communication hole 74a described above in the first embodiment.

The first communication passage 71Aa further includes a third communication hole 74c. A hole 118 is formed inside the wall 12a of the cylinder tube 12. The hole 118 extends inside the wall 12a of the cylinder tube 12 toward the lower side of the cylinder tube 12. The hole 118 passes through the recess 73. A portion of the hole 118 located below the recess 73 constitutes the third communication hole 74c. An upper portion of the hole 118 is sealed by a sealing member 120. The upper end of the third communication hole 74c opens at the side surface of the recess 73. The third communication hole 74c extends inside the wall 12a of the cylinder tube 12 toward the lower side of the cylinder tube 12.

The first communication passage 71Aa further includes a fourth communication hole 74d. A lower end of the third communication hole 74c is connected to one end of the fourth communication hole 74d. The other end of the fourth communication hole 74d opens at the second side surface 13B of the cylinder tube 12.

The first communication passage 71Aa further includes a fifth communication hole 74e. The upper end of the fifth communication hole 74e communicates with a screw hole 130 described later. The lower end of the fifth communication hole 74e reaches the annular recess 30 formed in the cylinder tube 12. In a similar manner to the first communication passage 71A described above in the first embodiment, the first communication passage 71Aa communicates with the first pressure chamber 112 via the groove 98a formed in the lower damper 98. That is, the fifth communication hole 74e has an opening 79b communicating with the first pressure chamber 112. The opening 79b communicating with the first pressure chamber 112 is provided on the second side portion 12g of the cylinder tube 12.

A flow passage block 122 is attached to the wall 12a of the cylinder tube 12. The flow passage block 122 is attached to the second side portion 12g of the cylinder tube 12. In other words, the flow passage block 122 is attached to the back surface of the magnetic chuck 10. The flow passage block 122 has a side surface 123A and a side surface 123B. The side surface 123A and the side surface 123B are located opposite to each other. The side surface 123A of the flow passage block 122 is in contact with the second side surface 13B of the cylinder tube 12.

An in-block flow passage 124 is formed inside the flow passage block 122. The first communication passage 71Aa further includes the in-block flow passage 124. The in-block flow passage 124 includes a sixth communication hole 74f. On a side surface 123A of the flow passage block 122, a step 144 to which a seal member 142 is attached is formed. One end of the sixth communication hole 74f opens at the step 144. The central axis of the sixth communication hole 74f coincides with the central axis of the fourth communication hole 74d. The one end of the sixth communication hole 74f communicates with the fourth communication hole 74d. The other end of the sixth communication hole 74f opens at the bottom surface of a recess 132 described later. The seal member 142 is attached to the step 144. The seal member 142 provides a seal between the second side surface 13B of the cylinder tube 12 and the side surface 123A of the flow passage block 122. As a material of the seal member 142, for example, fluoro rubber or the like is used, but the material is not limited thereto.

The in-block flow passage 124 further includes a seventh communication hole 74g. A hole 126 is formed inside the flow passage block 122. The hole 126 extends upward inside the flow passage block 122. The hole 126 passes through a through hole 146 described later. The hole 126 reaches the side surface of the recess 132. A portion of the hole 126 located between the through hole 146 and the recess 132 constitutes the seventh communication hole 74g. A lower portion of the hole 126 is sealed by a sealing member 128. The upper end of the seventh communication hole 74g opens at the side surface of the recess 132. The lower end of the seventh communication hole 74g opens at the side surface of the through hole 146.

The screw hole 130 is formed inside the wall 12a of the cylinder tube 12. A distal end portion of a hollow bolt 154 described later is screwed into the screw hole 130. One end of the screw hole 130 communicates with the fifth communication hole 74e. The other end of the screw hole 130 opens at the second side surface 13B of the cylinder tube 12. The screw hole 130 constitutes a part of the first communication passage 71Aa.

A recess 132 is formed in the flow passage block 122. The recess 132 opens at the side surface 123B of the flow passage block 122. The depth direction of the recess 132 is a direction from the side surface 123B toward the side surface 123A. The bottom surface of the recess 132 forms a valve seat 132a against which a valve element 134c described later abuts.

The directional control valve 134 for controlling the direction of fluid flow is mounted in the recess 132. A check valve 134A is used as the directional control valve 134. The check valve 134A includes a support portion 134a, a spring 134b, and the valve element 134c. The valve element 134c is movable relative to the support portion 134a. The direction in which the valve element 134c moves is the direction along the central axis of the support portion 134a. That is, the direction in which the valve element 134c moves is the depth direction of the recess 132. The spring 134b elastically biases the valve element 134c toward the valve seat 132a. When the internal pressure of the sixth communication hole 74f is higher than the internal pressure of the seventh communication hole 74g, first and second forces as follows are applied to the valve element 134c. The first force is a force that is applied to the valve element 134c in accordance with the differential pressure between the seventh communication hole 74g and the sixth communication hole 74f. The second force is a force that is applied to the valve element 134c by the spring 134b. The direction of the first force and the direction of the second force are opposite to each other. If the first force is greater than the second force, the check valve 134A opens. That is, if the internal pressure of the sixth communication hole 74*f* becomes sufficiently higher than the internal pressure of the seventh communication hole 74*g*, the check valve 134A opens. If the first force is less than the second force, the check valve 134A is closed. If the internal pressure of the sixth communication hole 74*f* is lower than the internal pressure of the seventh communication hole 74*g*, the check valve 134A is closed. The check valve 134A allows the fluid to flow from the second pressure chamber 114 toward the first pressure chamber 112 via the first communication passage 71Aa. The check valve 134A prevents the fluid from flowing from the first pressure chamber 112 toward the second pressure chamber 114 via the first communication passage 71Aa.

A step 136 to which a snap ring (C-shaped retaining ring) 138 is attached is formed in the recess 132. The snap ring 138 is attached to the step 136. The snap ring 138 secures the directional control valve 134 within the recess 132.

A seal member 140 is attached to the directional control valve 134. The seal member 140 provides a seal between the directional control valve 134 and the recess 132. As a material of the seal member 140, for example, fluoro rubber or the like is used, but the material is not limited thereto.

A through hole 146 is formed in the flow passage block 122. The central axis of the through hole 146 coincides with the central axis of the screw hole 130. On the side surface 123A of the flow passage block 122, a step 148 to which a seal member 150 is attached is formed. One end of the through hole 146 opens at the step 148. The one end of the through hole 146 communicates with the screw hole 130. A recess 152 in which a head 154*a* of the hollow bolt 154 is housed is formed in the side surface 123B of the flow passage block 122. The other end of the through hole 146 opens at the bottom surface of the recess 152.

The flow passage block 122 is attached to the wall 12*a* of the cylinder tube 12 using the hollow bolt 154. The hollow bolt 154 is provided with a cavity 154*b*. The central axis of the cavity 154*b* coincides with the central axis of the hollow bolt 154. A hole 154*c* reaching the cavity 154*b* is formed in the hollow bolt 154. The central axis of the hole 154*c* crosses the central axis of the cavity 154*b*. One end of the cavity 154*b* communicates with the seventh communication hole 74*g* via the hole 154*c* and the through hole 146. The other end of the cavity 154*b* communicates with the screw hole 130. The cavity 154*b* constitutes a part of the in-block flow passage 124.

A gasket 156 is attached to the recess 152. The gasket 156 provides a seal between the hollow bolt 154 and the flow passage block 122.

An upper portion 122*a* of the flow passage block 122 is thinner than the portion other than the upper portion 122*a* of the flow passage block 122. A through hole 158 is formed in the upper portion 122*a* of the flow passage block 122. The central axis of the through hole 158 coincides with the central axis of the recess 73. The recess 73 is a screw hole. The distal end portion of the flow rate regulating valve 72 is screwed into the recess 73. The upper portion 122*a* of the flow passage block 122 is attached to the wall 12*a* of the cylinder tube 12 using the flow rate regulating valve 72.

When the supply of the fluid into the second pressure chamber 114 is started and the discharge of the fluid from the first pressure chamber 112 is started, a differential pressure is generated between the first pressure chamber 112 and the second pressure chamber 114. That is, a force to drive the piston assembly 14 in a direction from the second pressure chamber 114 toward the first pressure chamber 112 acts on the piston assembly 14 in accordance with the differential pressure between the first pressure chamber 112 and the second pressure chamber 114. The first pressure chamber 112 communicates with the seventh communication hole 74*g*, and the second pressure chamber 114 communicates with the sixth communication hole 74*f*. Therefore, when a force to drive the piston assembly 14 acts in a direction from the second pressure chamber 114 toward the first pressure chamber 112, a force to open the check valve 134A acts on the check valve 134A. That is, the force to open the check valve 134A acts on the check valve 134A in accordance with the differential pressure between the first pressure chamber 112 and the second pressure chamber 114. If the second pressure chamber 114 is sufficiently higher than the first pressure chamber 112, the check valve 134A opens. That is, if the internal pressure of the sixth communication hole 74*f* becomes sufficiently higher than the internal pressure of the seventh communication hole 74*g*, the check valve 134A opens.

When the supply of the fluid into the first pressure chamber 112 is started and the discharge of the fluid from the second pressure chamber 114 is started, a differential pressure is generated between the first pressure chamber 112 and the second pressure chamber 114. That is, a force to drive the piston assembly 14 in a direction from the first pressure chamber 112 toward the second pressure chamber 114 acts on the piston assembly 14 in accordance with the differential pressure between the first pressure chamber 112 and the second pressure chamber 114. As described above, the first pressure chamber 112 communicates with the seventh communication hole 74*g*, and the second pressure chamber 114 communicates with the sixth communication hole 74*f*. Therefore, the internal pressure of the sixth communication hole 74*f* becomes lower than the internal pressure of the seventh communication hole 74*g*. Therefore, when a force to drive the piston assembly 14 acts in the direction from the first pressure chamber 112 to the second pressure chamber 114, the check valve 134A is closed. When the directional control valve 134 is closed, the fluid does not flow into the first pressure chamber 112 after the piston assembly 14 reaches the top dead center (see FIG. 10). At this stage, since the workpiece W is released from the magnetic chuck 10, the magnetic chuck 10 is not heated by the workpiece W. That is, at this stage, it is not necessary to cool the magnetic chuck 10 by the fluid. Therefore, there is no particular problem even if the fluid does not flow into the first pressure chamber 112.

As described above, in the present embodiment, when the force to drive the piston assembly 14 acts in the direction from the first pressure chamber 112 toward the second pressure chamber 114, the directional control valve 134 is closed. According to this embodiment, since the directional control valve 134 is closed, waste of the fluid can be prevented.

(Modification)

Figure 12:
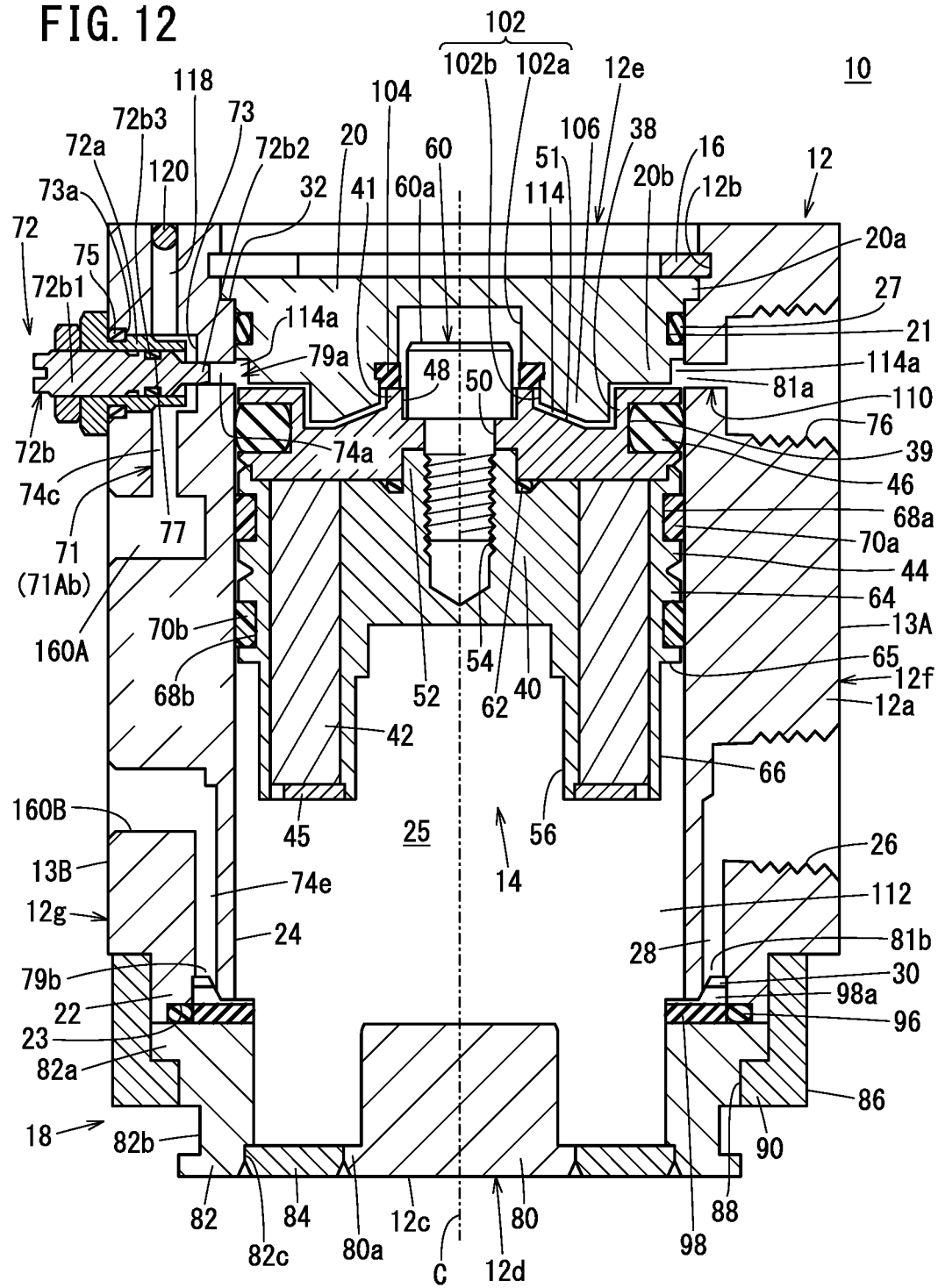
FIG. 12 is a sectional view showing a part of a magnetic chuck according to a modification of the fourth embodiment.
Figure 13:
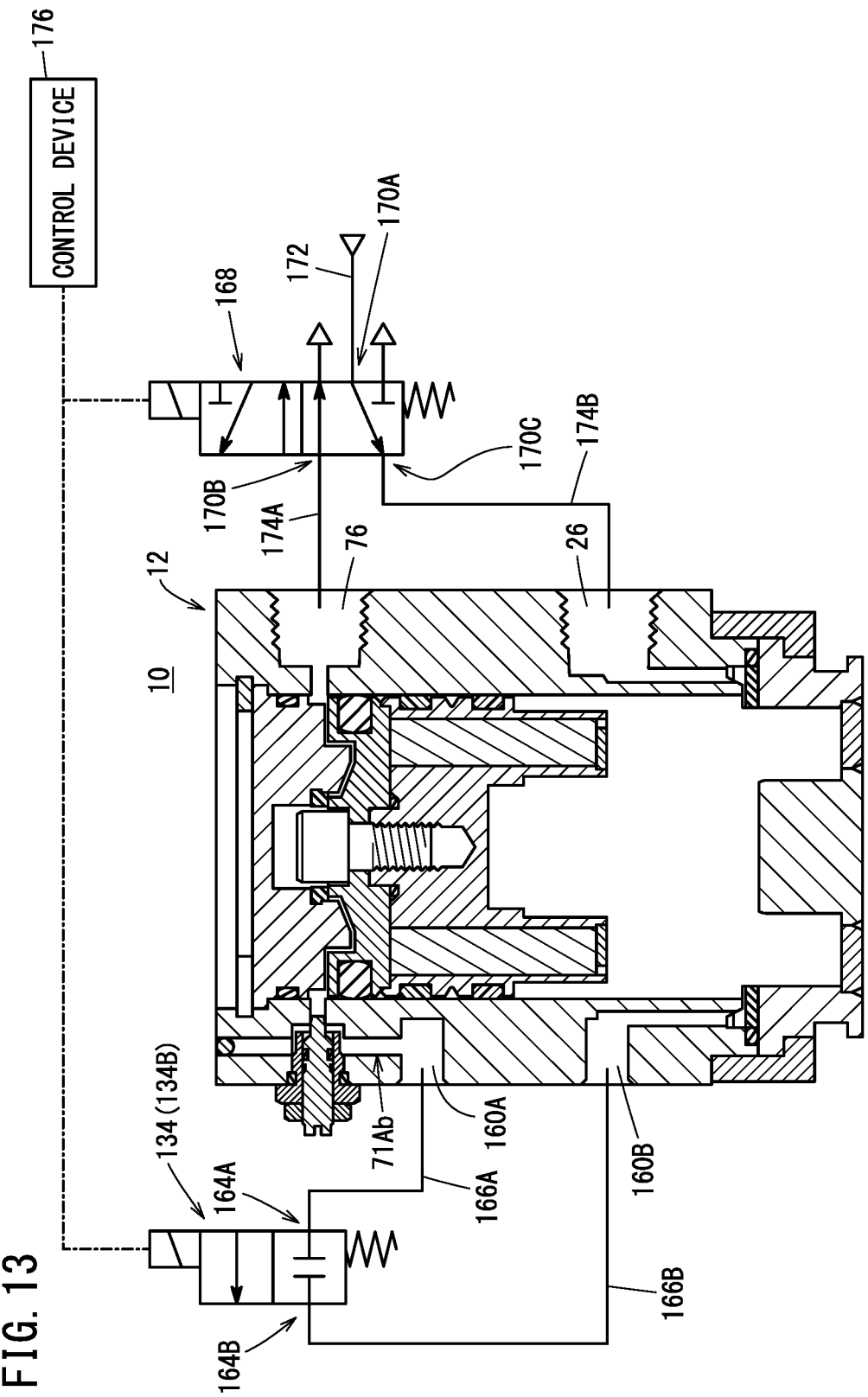
FIG. 13 is a block diagram showing the magnetic chuck according to the modification of the fourth embodiment.

Next, a magnetic chuck according to a modification of the present embodiment will be described with reference to FIGS. 12 and 13. FIG. 12 is a cross-sectional view showing a part of the magnetic chuck according to the present embodiment. FIG. 12 shows a state in which a piston assembly 14 is positioned at the top dead center. FIG. 13 is a block diagram showing the magnetic chuck according to the present embodiment.

In the magnetic chuck 10 according to the present modification, a solenoid directional control valve 134B is used as a directional control valve 134.

In a cylinder tube 12 according to the present modification, similarly to the cylinder tube 12 described above according to the first to third embodiments, a communication passage 71 that allows the first pressure chamber 112 and the second pressure chamber 114 to communicate with each other is formed. The communication passage 71 includes a first communication passage 71Ab. A part of the first communication passage 71Ab is formed inside a wall 12a of the cylinder tube 12. The first communication passage 71Ab is formed separately from the internal space 25 of the cylinder tube 12. Similarly to the first communication passage 71A described above in the first embodiment, the first communication passage 71Ab is provided in the second side portion 12g of the cylinder tube 12.

The first communication passage 71Ab includes a first communication hole 74a. The first communication hole 74a in the present embodiment is the same as the first communication hole 74a described above in the first embodiment.

The first communication passage 71Ab further includes a third communication hole 74c. A hole 118 is formed inside the wall 12a of the cylinder tube 12. The hole 118 extends inside the wall 12a of the cylinder tube 12 toward the lower side of the cylinder tube 12. The hole 118 passes through a recess 73. A portion of the hole 118 located below the recess 73 constitutes a third communication hole 74c. An upper portion of the hole 118 is sealed by a sealing member 120. The upper end of the third communication hole 74c opens at the side surface of the recess 73. The third communication hole 74c extends inside the wall 12a of the cylinder tube 12 toward the lower side of the cylinder tube 12. The lower end of the third communication hole 74c opens at a side surface of a port 160A described later.

The port 160A is formed in the wall 12a of the cylinder tube 12. The port 160A opens at a second side surface 13B of the cylinder tube 12. The port 160A communicates with the third communication hole 74c.

A port 160B is formed in the wall 12a of the cylinder tube 12. The port 160B is located below the port 160A. The port 160B opens at the second side surface 13B of the cylinder tube 12. The port 160B communicates with the fifth communication hole 74e.

As shown in FIG. 13, the solenoid directional control valve 134B is provided with ports 164A and 164B. The port 164A communicates with the port 160A via a flow passage 166A. The port 164B communicates with the port 160B via a flow passage 166B.

A solenoid directional control valve 168 is provided with ports 170A, 170B and 170C. Fluid is supplied to the port 170A via a flow passage 172. The port 170B communicates with the second supply/discharge port 76 via a flow passage 174A. The port 170C communicates with the first supply/discharge port 26 via a flow passage 174B.

A control device 176 controls the magnetic chuck 10. The control device 176 includes, for example, a calculation unit (processing unit, not illustrated) and a storage unit (not illustrated). The arithmetic unit is constituted by, for example, a processor such as a central processing unit (CPU). That is, the calculation unit is constituted by processing circuitry. A program stored in the storage unit is executed by the calculation unit to control the magnetic chuck 10.

The solenoid directional control valves 134B and 168 are switched by a signal supplied from the control device 176. The control device 176 switches the solenoid directional control valve 168 to supply fluid into the second pressure chamber 114 via the second supply/discharge port 76. When the fluid is supplied into the second pressure chamber 114 via the second supply/discharge port 76, the control device 176 switches the solenoid directional control valve 134B to allow the fluid to flow in the first communication passage 71Ab. That is, in such a case, the control device 176 opens the solenoid directional control valve 134B to allow the fluid to flow in the first communication passage 71Ab. Accordingly, the fluid is introduced into the first pressure chamber 112 via the first communication passage 71Ab.

The control device 176 switches the solenoid directional control valve 168 to supply the fluid into the first pressure chamber 112 via the first supply/discharge port 26. When the fluid is supplied into the first pressure chamber 112 via the first supply/discharge port 26, the control device 176 switches the solenoid directional control valve 134B to block the fluid from flowing in the first communication passage 71Ab. That is, in such a case, the control device 176 closes the solenoid directional control valve 134B to prevent the fluid from flowing in the first communication passage 71Ab. This prevents the fluid from flowing from the first pressure chamber 112 to the second pressure chamber 114 via the first communication passage 71Ab.

Also in this modification, when the force to drive the piston assembly 14 acts in the direction from the first pressure chamber 112 toward the second pressure chamber 114, the directional control valve 134 is closed. Therefore, also in this modification, waste of the fluid can be prevented.

Modified Embodiments

Although preferred embodiments of the present invention have been described above, the present invention is not particularly limited to the embodiments described above, and various modifications can be adopted without deviating from the gist of the present invention.

For example, the first embodiment and the second embodiment may be combined. That is, the first communication passage 71A and the second communication passage 71B may be provided in the magnetic chuck 10.

The first embodiment and the third embodiment may be combined. That is, the first communication passage 71A and the third communication passage 71C may be provided in the magnetic chuck 10.

The second embodiment and the third embodiment may be combined. That is, the second communication passage 71B and the third communication passage 71C may be provided in the magnetic chuck 10.

In addition, the first embodiment, the second embodiment, and the third embodiment may be combined. That is, the first communication passage 71A, the second communication passage 71B, and the third communication passage 71C may be provided in the magnetic chuck 10.

The fourth embodiment and the second embodiment may be combined. That is, the first communication passage 71Aa and the second communication passage 71B may be provided in the magnetic chuck 10. Further, the modification of the fourth embodiment may be combined with the second embodiment. That is, the first communication passage 71Ab and the second communication passage 71B may be provided in the magnetic chuck 10.

The fourth embodiment and the third embodiment may be combined. That is, the first communication passage 71Aa and the third communication passage 71C may be provided in the magnetic chuck 10. Further, the modification of the fourth embodiment may be combined with the third embodiment. That is, the first communication passage 71Ab and the third communication passage 71C may be provided in the magnetic chuck 10.

The fourth embodiment, the second embodiment, and the third embodiment may be combined. That is, the first communication passage 71Aa, the second communication passage 71B, and the third communication passage 71C may be provided in the magnetic chuck 10. Further, the modification of the fourth embodiment, the second embodiment, and the third embodiment may be combined. That is, the first communication passage 71Ab, the second communication passage 71B, and the third communication passage 71C may be provided in the magnetic chuck 10.

The above embodiments are summarized as follows.

The magnetic chuck (10) includes the cylinder tube (12) including the workpiece attraction surface (12c) to which the workpiece (W) is attracted, the piston assembly (14) including the permanent magnet (42) and being movable in an internal space (25) of the cylinder tube, the piston assembly separating the internal space of the cylinder tube into the first pressure chamber (112) and the second pressure chamber (114), the first supply/discharge port (26) formed in the cylinder tube and communicating with the first pressure chamber, the second supply/discharge port (76) formed in the cylinder tube and communicating with the second pressure chamber, and the communication passage (71) configured to allow the first pressure chamber and the second pressure chamber to communicate with each other. According to such a configuration, since the communication passage is formed so as to allow the first pressure chamber and the second pressure chamber to communicate with each other, the fluid continues to flow into the first pressure chamber and the second pressure chamber. Even when the piston assembly is located at the bottom dead center, the fluid continues to flow into the first pressure chamber and the second pressure chamber. Therefore, even when a high-temperature workpiece is attracted by the magnetic chuck, it is possible to prevent the constituent elements of the magnetic chuck from being damaged. Therefore, according to such a configuration, it is possible to provide a magnetic chuck having good heat resistance.

The communication passage may include the first communication passage (71A, 71Aa, 71Ab), at least a part of the first communication passage may be formed inside the wall (12a) of the cylinder tube, the first communication passage is formed separately from the internal space of the cylinder tube, and the first communication passage may include the opening (79b) communicating with the first pressure chamber, and the opening (79a) communicating with the second pressure chamber.

The magnetic chuck (10) may further include the damper (98) configured to alleviate a shock generated when the piston assembly is moved in the internal space, wherein the first communication passage may communicate with the first pressure chamber via the groove (98a) formed in the damper.

The first supply/discharge port may communicate with the first pressure chamber via the other groove (98a) formed in the damper.

The magnetic chuck (10) may further include the flow rate regulating valve (72) configured to regulate a flow rate of fluid flowing through the first communication passage. According to such a configuration, the flow rate of the fluid flowing through the first communication passage can be appropriately adjusted.

The cylinder tube may include the first end portion (12d) including the workpiece attraction surface and the second end portion (12e) opposite to the first end portion, and the flow rate regulating valve may be provided at the second end portion. According to such a configuration, since it is possible to sufficiently secure the distance between the workpiece and the flow rate regulating valve, it is possible to sufficiently suppress damage to a seal member or the like provided in the flow rate regulating valve.

The first communication passage may include the communication hole (74a) having the opening communicating with the second pressure chamber, the central axis of the communication hole and the central axis of the flow rate regulating valve may coincide with each other.

The first communication passage (71Aa, 71Ab) may be further provided with a directional control valve (134) configured to control a direction in which fluid flows, the first pressure chamber may be positioned between the second pressure chamber and the workpiece attraction surface, the directional control valve may open when a force to drive the piston assembly acts in a direction from the second pressure chamber toward the first pressure chamber, and the directional control valve may be closed when the force to drive the piston assembly acts in a direction from the first pressure chamber toward the second pressure chamber. According to such a configuration, waste of the fluid can be prevented.

The directional control valve may be the check valve (134A), and the check valve may be configured to allow a flow of the fluid from the second pressure chamber toward the first pressure chamber via the first communication passage and block a flow of the fluid from the first pressure chamber toward the second pressure chamber via the first communication passage.

The magnetic chuck (10) may further include the flow passage block (122) attached to the wall of the cylinder tube, wherein the first communication passage may include the in-block flow passage (124) formed inside the flow passage block, and the flow passage block may be provided with the check valve.

The flow passage block may be attached to the wall of the cylinder tube using the hollow bolt (154), the cavity (154b) provided in the hollow bolt may constitute a part of the in-block flow passage. According to such a configuration, it is possible to contribute to downsizing and the like of the magnetic chuck.

The directional control valve may be the solenoid directional control valve (134B) configured to be switched by a signal supplied from a control device, when the fluid is supplied into the second pressure chamber via the second supply/discharge port, the solenoid directional control valve may be switched so as to allow the flow of the fluid in the first communication passage, and when the fluid is supplied into the first pressure chamber via the first supply/discharge port, the solenoid directional control valve may be switched so as to prevent the flow of the fluid in the first communication passage.

The communication passage may include the second communication passage (71B) configured by the groove (116) that is formed in a wall surface of the internal space of the cylinder tube.

The communication passage may include the third communication passage (71C) formed in the piston assembly, and the third communication passage may have the opening (83b) communicating with the first pressure chamber and the opening (83a) communicating with the second pressure chamber.

The cylinder tube may include the first side portion (12f) and the second side portion (12g) opposite to each other with respect to the central axis (C) of the cylinder tube, the first supply/discharge port and the second supply/discharge port may be provided in the first side portion, and the communication passage may be provided at the second side portion or at least between the second side portion and the central axis. According to such a configuration, since the components of the magnetic chuck can be more effectively cooled, it is possible to provide a magnetic chuck having better heat resistance.

What is claimed is:

1. A magnetic chuck comprising:
a cylinder tube including a workpiece attraction surface to which a workpiece is attracted;
a piston assembly including a permanent magnet and being movable in an internal space of the cylinder tube, the piston assembly separating the internal space of the cylinder tube into a first pressure chamber and a second pressure chamber;
a damper configured to alleviate a shock generated when the piston assembly is moved in the internal space;
a first supply/discharge port formed in the cylinder tube and communicating with the first pressure chamber;
a second supply/discharge port formed in the cylinder tube and communicating with the second pressure chamber; and
a communication passage configured to allow the first pressure chamber and the second pressure chamber to communicate with each other, wherein:
the communication passage includes a first communication passage,
at least a part of the first communication passage is formed inside a wall of the cylinder tube,
the first communication passage is formed separately from the internal space of the cylinder tube,
the first communication passage includes an opening communicating with the first pressure chamber, and an opening communicating with the second pressure chamber, and
the first communication passage communicates with the first pressure chamber via a groove formed in the damper.

2. The magnetic chuck according to claim 1, wherein the first supply/discharge port communicates with the first pressure chamber via another groove formed in the damper.

3. The magnetic chuck according to claim 1, further comprising a flow rate regulating valve configured to regulate a flow rate of fluid flowing through the first communication passage.

4. The magnetic chuck according to claim 1, wherein the cylinder tube includes a first side portion and a second side portion opposite to each other with respect to a central axis of the cylinder tube,
the first supply/discharge port and the second supply/discharge port are provided in the first side portion, and
the communication passage is provided at the second side portion or at least between the second side portion and the central axis.

5. A magnetic chuck comprising:
a cylinder tube including a workpiece attraction surface to which a workpiece is, attracted:
a piston assembly including, a permanent magnet and being movable in an internal space of the cylinder tube the piston assembly separating the internal space of the cylinder tube into a first pressure chamber and a second pressure chamber;
a first supply/discharge port formed in the cylinder tube and communicating with the first pressure chamber;
a second supply/discharge port formed in the cylinder tube and communicating with the second pressure chamber; and
a communication passage configured to allow the first pressure chamber and the second pressure chamber to communicate with each other, wherein:
the communication passage includes a first communication passage,
at least a part of the first communication passage is formed inside a wall of the cylinder tube,
the first communication passage is formed separately from the internal space of the cylinder tube,
the first communication passage includes an opening communicating with the first pressure chamber, and an opening communicating with the second pressure chamber,
a flow rate regulating valve is configured to regulate a flow rate of fluid flowing through the first communication passage,
the cylinder tube includes a first end portion including the workpiece attraction surface and a second end portion opposite to the first end portion, and
the flow rate regulating valve is provided at the second end portion.

6. The magnetic chuck according to claim 5, wherein the first communication passage includes a communication hole having the opening communicating with the second pressure chamber,
a central axis of the communication hole and a central axis of the flow rate regulating valve coincide with each other.

* * * * *